United States Patent [19]
Banks et al.

[11] Patent Number: 5,413,321
[45] Date of Patent: May 9, 1995

[54] SYSTEM AND METHOD FOR OPERATING A DOCUMENT ASSEMBLY SYSTEM

[75] Inventors: Jon M. Banks; Melvin R. Clearman, Jr.; James C. Colson, all of Austin; David O. Craig, Round Rock; David C. Loose, Austin; James E. Varan, Georgetown, all of Tex.

[73] Assignee: International Business Machines Corporation, Armonk, N.Y.

[21] Appl. No.: 3,382

[22] Filed: Jan. 12, 1993

[51] Int. Cl.⁶ .................. B65H 39/02; G06F 15/20
[52] U.S. Cl. ............................. 270/58; 364/478
[58] Field of Search .................. 270/54, 55, 58; 364/478

[56] References Cited

U.S. PATENT DOCUMENTS

| | | | |
|---|---|---|---|
| Re. 32,690 | 6/1988 | Wong | 270/54 |
| 3,819,173 | 6/1974 | Anderson et al. | |
| 3,899,165 | 8/1975 | Abram et al. | 270/54 |
| 3,924,846 | 12/1975 | Reed | |
| 4,121,818 | 10/1978 | Riley et al. | 270/54 |
| 4,395,031 | 7/1983 | Gruber et al. | |
| 4,500,083 | 2/1985 | Wong | 270/54 |
| 4,519,598 | 5/1985 | McCain et al. | |
| 4,674,052 | 6/1987 | Wong et al. | 270/54 |
| 4,768,766 | 9/1988 | Berger et al. | |
| 4,789,147 | 12/1988 | Berger et al. | |
| 4,790,119 | 12/1988 | McDaniels | |
| 5,013,019 | 5/1991 | Samuels | |
| 5,028,192 | 7/1991 | Lindsay et al. | |
| 5,054,984 | 10/1991 | Chan et al. | |
| 5,098,076 | 3/1992 | Kelsey | 250/54 |
| 5,326,209 | 7/1994 | Duke | 270/54 X |

Primary Examiner—Edward K. Look
Assistant Examiner—John Ryznic
Attorney, Agent, or Firm—Michael A. Davis, Jr.

[57] ABSTRACT

A method and system are provided for operating a document assembly system. Assembly is initiated of a set of documents in a sequence. Improper assembly is detected of a particular one of the documents. Assembly is reinitiated of a replacement for the particular document after each preceding document in the sequence of the set is no longer being assembled by the document assembly system. In another embodiment, improper assembly of particular documents is detected and stored in memory, the stored indications are sorted according to the original sequence, and assembly of replacements for the particular documents is reinitiated according to the sequence.

30 Claims, 20 Drawing Sheets

| y (cycle = $K_2+y$) | \multicolumn{13}{l}{x (Slot = $K_1+x$) — VARIABLE CUSTOMIZATION LOCATION} | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| 0 | G | | | | | | | | | | | | |
| 1 | G | G | | | | | | | | | | | |
| 2 | G | G | G | | | | | | | | | | |
| 3 | G | G | G | G | | | | | | | | | |
| 4 | G | G | G | G | G | | | | | | | | |
| 5 | G | G | G | G | G | 1 | | | | | | | |
| 6 | G | G | G | G | G | 2 | 1 | | | | | | |
| 7 | G | G | G | G | G | 3 | 2 | 1 | | | | | |
| 8 | G | G | G | G | G | (4) | 3 | 2 | 1 | | | | |
| 9 | G | G | G | G | G | 5 | (4) | 3 | 2 | 1 | | | |
| 10 | G | G | G | G | G | 6 | 5 | (4) | 3 | 2 | 1 | | |
| 11 | G | G | G | G | G | 7 | 6 | 5 | (4) | 3 | 2 | 1 | |
| 12 | G | G | G | G | G | 8 | 7 | 6 | 5 | | 3 | 2 | (1) |
| 13 | G | G | (G) | G | G | (1) | 8 | 7 | 6 | 5 | | 3 | (2) |
| 14 | G | G | G | | G | (2) | (1) | 8 | (7) | 6 | 5 | | 3 |
| 15 | G | G | G | G | | 9 | (2) | (1) | 8 | | 6 | (5) | |
| 16 | G | G | G | G | G | | 9 | (2) | (1) | 8 | | 6 | |
| 17 | G | G | G | G | G | (4) | | 9 | (2) | (1) | 8 | | 6 |
| 18 | G | G | G | G | G | (5) | (4) | | 9 | (2) | (1) | 8 | |
| 19 | G | G | G | G | G | (7) | (5) | (4) | | 9 | (2) | (1) | 8 |
| 20 | G | G | G | G | G | 10 | (7) | (5) | (4) | | 9 | (2) | (1) |
| 21 | G | G | G | G | G | 11 | 10 | (7) | (5) | (4) | | 9 | (2) |
| 22 | | G | G | G | G | | 11 | 10 | (7) | (5) | (4) | | 9 |

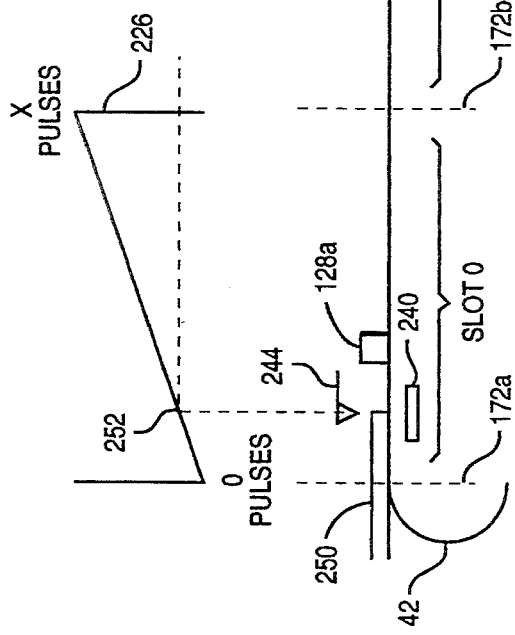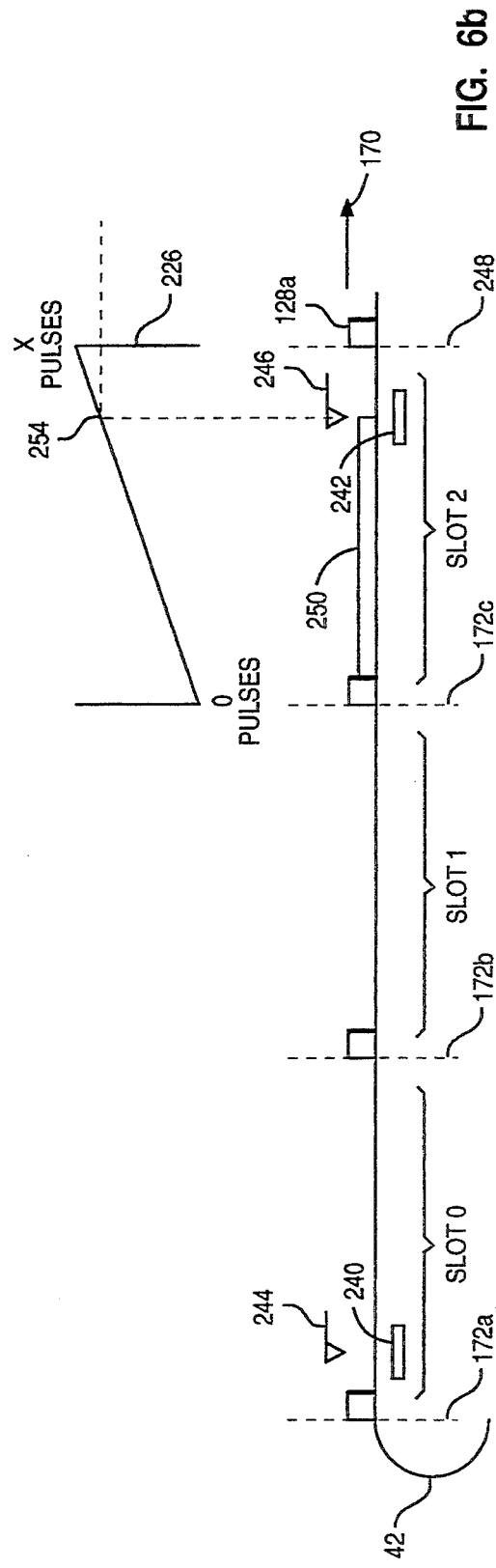
FIG. 6a
FIG. 6b

VARIABLE CUSTOMIZATION LOCATION x (Slot = $K_1 + x$)

| y (cycle = $K_2 + y$) | 0 | 1 | 2 | 3 | 4 | 5 | 6 | 7 | 8 | 9 | 10 | 11 | 12 |
|---|---|---|---|---|---|---|---|---|---|---|---|---|---|
| 0 | G | | | | | | | | | | | | |
| 1 | G | G | | | | | | | | | | | |
| 2 | G | G | G | | | | | | | | | | |
| 3 | G | G | G | G | | | | | | | | | |
| 4 | G | G | G | G | G | | | | | | | | |
| 5 | G | G | G | G | G | 1 | | | | | | | |
| 6 | G | G | G | G | G | 2 | 1 | | | | | | |
| 7 | G | G | G | G | G | 3 | 2 | 1 | | | | | |
| 8 | G | G | G | G | G | ④ | 3 | 2 | 1 | | | | |
| 9 | G | G | G | G | G | 5 | ④ | 3 | 2 | 1 | | | |
| 10 | G | G | G | G | G | 6 | 5 | ④ | 3 | 2 | 1 | | |
| 11 | G | G | G | G | G | 7 | 6 | 5 | ④ | 3 | 2 | 1 | |
| 12 | G | G | G | G | G | 8 | 7 | 6 | 5 | | 3 | 2 | ① |
| 13 | G | G | Ⓖ | G | G | ① | 8 | 7 | 6 | 5 | | 3 | ② |
| 14 | G | G | G | | G | ② | ① | 8 | ⑦ | 6 | 5 | | 3 |
| 15 | G | G | G | G | | 9 | ② | ① | 8 | | 6 | ⑤ | |
| 16 | G | G | G | G | G | | 9 | ② | ① | 8 | | 6 | |
| 17 | G | G | G | G | G | ④ | | 9 | ② | ① | 8 | | 6 |
| 18 | G | G | G | G | G | ⑤ | ④ | | 9 | ② | ① | 8 | |
| 19 | G | G | G | G | G | ⑦ | ⑤ | ④ | | 9 | ② | ① | 8 |
| 20 | G | G | G | G | G | 10 | ⑦ | ⑤ | ④ | | 9 | ② | ① |
| 21 | G | G | G | G | G | 11 | 10 | ⑦ | ⑤ | ④ | | 9 | ② |
| 22 | | G | G | G | G | | 11 | 10 | ⑦ | ⑤ | ④ | | 9 |

FIG. 10a

| MAILING SET | DOCUMENTS | TOTAL DOCS. |
|---|---|---|
| I | 1, 2, 3, 4 | 4 |
| II | 5, 6, 7, 8, 9, 10, 11 | 7 |

| Pocket | Signature |
|---|---|
| $D_1$ | $S_4$ |
| $D_2$ | null |
| $D_3$ | $S_2$ |
| ⋮ | ⋮ |
| $D_n$ | $S_q$ |

| Pocket | Cover |
|---|---|
| $E_1$ | $C_2$ |
| $E_2$ | $C_1$ |
| ⋮ | ⋮ |
| $E_r$ | null |

| Document ID | Makeup Code ID | Print Content |
|---|---|---|
| 372418 | AAAA | null |
| 372419 | BBBB | null |
| ⋮ | ⋮ | ⋮ |
| 372427 | XXXX | null |

FIG. 12d

| Document ID | Signature Pockets | | Cover Pocket | Divert Gate | Printer$_1$ | | Printer$_f$ |
|---|---|---|---|---|---|---|---|
| 372418 | $D_3, D_4, D_{10}, D_{17}$ | | $E_2$ | $G_2$ | | | $P_4(f)$ |
| 372419 | $D_4, D_8, D_{10}, D_{17}$ | $D_{18}$ | $E_1$ | $G_1$ | $P_2(f)$ | | |
| 372420 | $D_1, D_3, D_{10}, D_{22}$ | $D_{24}$ | $E_2$ | $G_1$ | | | $P_1(f)$ |
| ⋮ | ⋮ | | ⋮ | | | | ⋮ |
| 372427 | $D_{24}, D_{32}, D_{46},$ | | $E_2$ | $G_4$ | | | $P_3(f)$ |

FIG. 12e

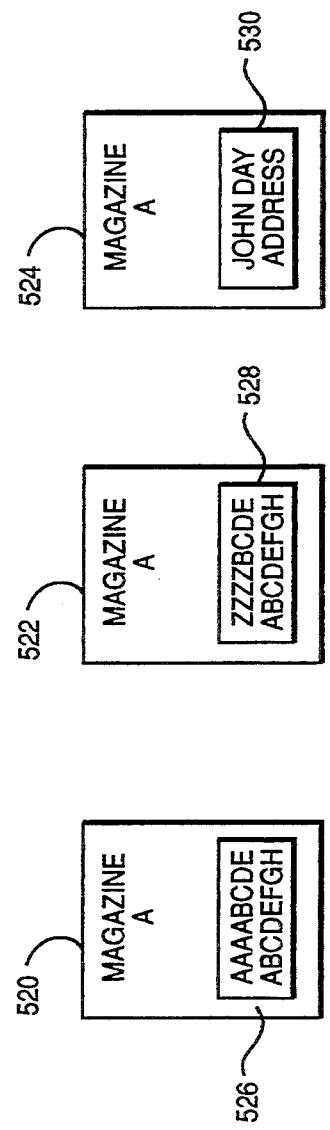

SYSTEM AND METHOD FOR OPERATING A DOCUMENT ASSEMBLY SYSTEM

CROSS-REFERENCES TO RELATED APPLICATIONS

This patent application is related to copending U.S. patent application Ser. No. 08/003,381, entitled System and Method for Calibrating a Document Assembly System, by J. C. Colson et al., and to copending U.S. patent application Ser. No. 08/003,176, entitled System and Method for Monitoring A Document Assembly System, by R. E. Bale et al., each filed concurrently herewith.

TECHNICAL FIELD OF THE INVENTION

This patent application relates in general to document assembly systems and in particular to a method and system for operating a document assembly system.

BACKGROUND OF THE INVENTION

A document assembly system assembles documents such as books, magazines and newspapers. In a document assembly system, one or more documents can be subject to an error in assembly. Such errantly assembled documents are desirably replaced by an identical document.

A typical non-demographic controlled system assembles a set of substantially identical documents. Since all assembled documents are substantially identical, previous techniques replace errantly assembled documents by assembling additional documents irrespective of sequence.

By comparison, a demographic controlled system assembles different types of custom documents in specified combinations, quantities, and sequences. Accordingly, the specified sequence and combination of custom documents is not maintained by previous techniques that replace errantly assembled documents by merely assembling additional documents. Moreover, such previous techniques fail to assist in maintaining the initial presorting of documents to preserve postage savings for bulk mailings where replacement documents are assembled.

To various extents, other previous techniques attempt to preserve some postage savings for bulk mailings. Nevertheless, such previous techniques present other shortcomings. For example, one previous technique purges properly assembled documents in order to assemble a replacement for an errantly assembled document.

Another previous technique stops the operation of a document assembly line in order to assemble a replacement for an errantly assembled document. Yet another previous technique reorders documents by using multiple paths between two points, so that additional paths and equipment are required to be added to a conventional bindery line in order to suitably reorder documents. Other previous techniques fail to accommodate a perfect bindery system in which different conveyor sections operate asynchronously. Thus, a need has arisen for a method and system for operating a document assembly system, which assist in maintaining the initial presorting of documents to preserve postage savings for bulk mailings where replacement documents are assembled. Also, a need has arisen for a method and system for operating a document assembly system, in which properly assembled documents are not purged in order to assemble a replacement for an errantly assembled document. Further, a need has arisen for a method and system for operating a document assembly system, in which the operation of a document assembly line is not stopped in order to assemble a replacement for an errantly assembled document.

Moreover, a need has arisen for a method and system for operating a document assembly system, which reorder documents by using a single path between two points, so that additional paths and equipment are not required to be added to a conventional bindery line in order to suitably reorder documents. Finally, a need has arisen for a method and system for operating a document assembly system, which accommodate a perfect bindery system in which different conveyor sections operate asynchronously.

SUMMARY OF THE INVENTION

In a first aspect of a method and system for operating a document assembly system, assembly is initiated of a set of documents in a sequence. Improper assembly is detected of a particular one of the documents. Assembly is reinitiated of a replacement for the particular document after each preceding document in the sequence of the set is no longer being assembled by the document assembly system.

In a second aspect, improper assembly is detected of particular ones of the documents. Assembly is reinitiated of replacements for the particular documents according to the sequence.

In a third aspect, assembly is initiated of a set of documents along a document assembly line having an entry point. Improper assembly is detected of a particular one of the documents. Assembly is reinitiated of a replacement for the particular document beginning at a point along the document assembly line after the entry point.

It is a technical advantage of the present invention that a method and system are provided for operating a document assembly system, which assist in maintaining the initial presorting of documents to preserve postage savings for bulk mailings where replacement documents are assembled.

It is another technical advantage of the present invention that properly assembled documents are not purged in order to assemble a replacement for an errantly assembled document.

It is a further technical advantage of the present invention that the operation of a document assembly line is not stopped in order to assemble a replacement for an errantly assembled document.

It is yet another technical advantage of the present invention that a method and system are provided for operating a document assembly system, which reorder documents by using a single path between two points, so that additional paths and equipment are not required to be added to a conventional bindery line in order to suitably reorder documents.

It is yet a further technical advantage of the present invention that a method and system are provided for operating a document assembly system, which accommodate a perfect bindery system in which different conveyor sections operate asynchronously.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6a–b are illustrations of activation elements located by the control system of FIG. 2 according to the calibrating technique of the preferred embodiment;

FIGS. 10a–c are illustrations of an exemplary operation of a document assembly system according to the operating technique of FIG. 8;

FIGS. 12a–e are illustrations of information records processed by the control system of FIG. 2 according to the monitoring technique of FIGS. 11a–c; and FIGS. 13a–b are illustrations of an exemplary operation of a document assembly system according to the monitoring technique of FIGS. 11a–c.

DETAILED DESCRIPTION OF THE PREFERRED EMBODIMENT

The preferred embodiment of the present invention and its advantages are best understood by referring to FIGS. 1–13b of the drawings, like numerals being used for like and corresponding parts of the various drawings.

Figure 1:
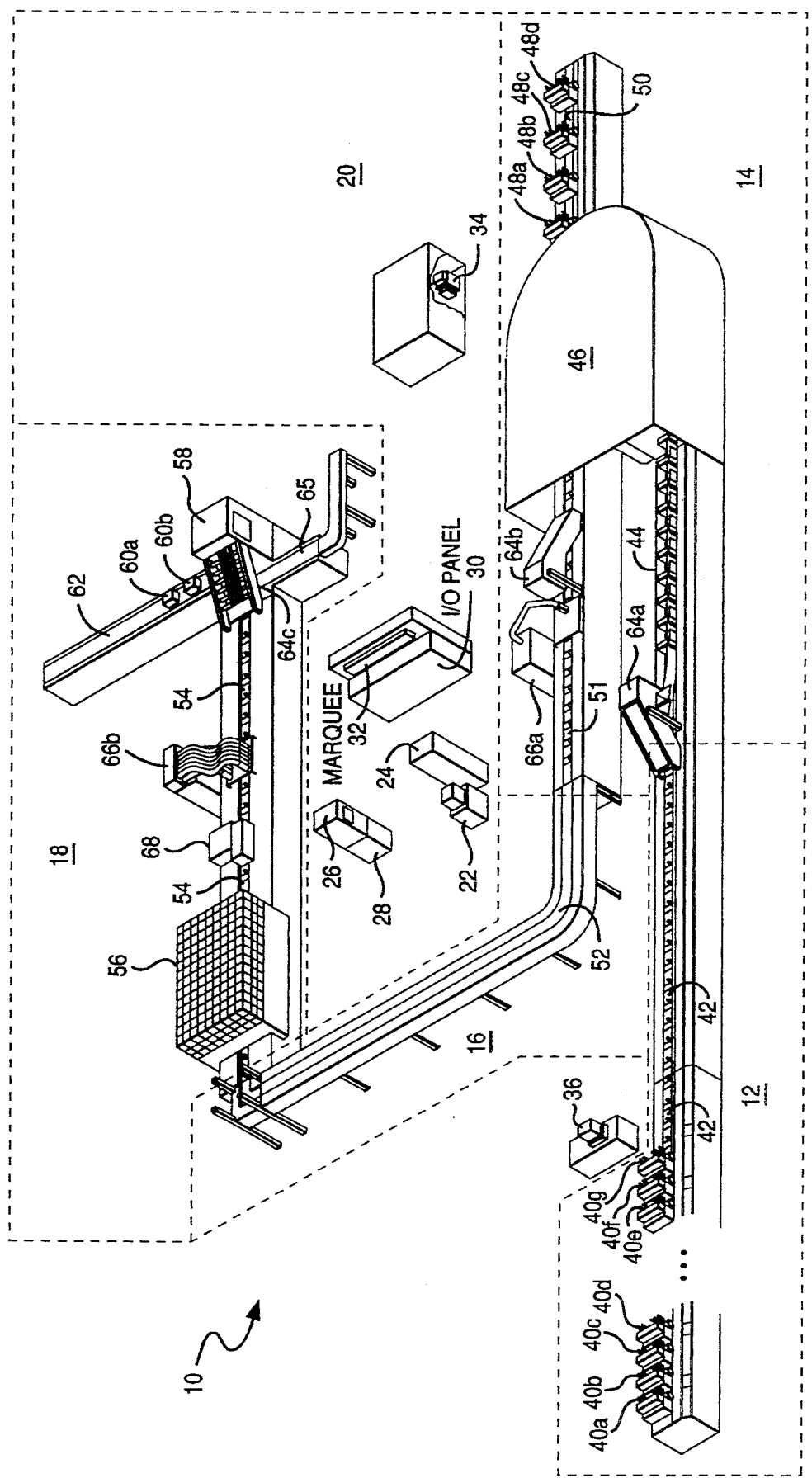
FIG. 1 is an illustration of a document assembly system according to the preferred embodiment

FIG. 1 is an illustration of a document assembly system, indicated generally at 10, according to the preferred embodiment. In the preferred embodiment, document assembly system 10 is a comprehensive perfect bindery system that assembles documents bound with glue, as compared with other binding materials such as staples or stitches.

Exemplary types of documents are a book, a magazine, and a newspaper. A document "edition" is a set of documents assembled by document assembly system 10 in response to a particular setup and configuration. A "generic" document is material common to all documents of a document edition. A "custom" document is a generic document having content not common to all documents of a document edition.

Document assembly system 10 includes a gather section indicated generally by dashed enclosure 12, a binder section indicated generally by dashed enclosure 14, a dry cure table section indicated generally by dashed enclosure 16, and a trimmer section indicated generally by dashed enclosure 18. Together, gather section 12, binder section 14, dry cure table section 16, and trimmer section 18 form a document assembly line of document assembly system 10.

Document assembly system 10 further includes a control system indicated generally by dashed enclosure 20. In the preferred embodiment, control system 20 has a distributed architecture. Accordingly, control system 20 includes a bindery application station controller ("BASC") 22, a bindery real time controller ("BRTC") 24, zero or more printer application station controllers ("PASC") 26, and zero or more printer real time controllers ("PRTC") 28 each associated with a respective PASC 26. Also, control system 20 includes an input/output ("I/O") panel 30, a marquee 32, and a tape reader 34. Control system 20 further includes a remote terminal 36 located proximate to gather section 12. Interrelations between the various elements of control system 20 are discussed further hereinbelow in connection with FIG. 2.

Gather section 12 includes multiple paper feeders ("gather pockets") 40a–g disposed over a conveyor For clarity, FIG. 1 shows seven gather pockets, although gather section 12 can include numerous additional gather pockets. As discussed further hereinbelow in connection with FIGS. 3 and 4, in response to signals from control system 20, gather pockets 40a–g and conveyor 42 selectively gather one or more signatures (not shown in FIG. 1) for one or more documents. In the preferred embodiment, control system 20 operates gather section 12 to selectively gather sets of signatures for multiple customized versions of one or more documents, contemporaneously.

Conveyor 42 leads sets of gathered signatures from gather section 12 to a conveyor 44 of binder section 14. Conveyor 44 further leads the sets of gathered signatures into a binder unit 46 of binder section 14. Binder section 14 also includes multiple cover paper feeders ("cover pockets") 48a–d disposed over a conveyor 50. In response to signals from control system 20, cover pockets 48a–d and conveyor 50 selectively lead one or more covers (not shown in FIG. 1) for one or more documents into binder unit 46. Using glue, binder unit 46 binds each set of gathered signatures from conveyor 44 with one or more covers from conveyor 50.

A conveyor 51 leads sets of bound and covered signatures from binder unit 46 to a conveyor 52 of dry cure table section 16. The sets of bound and covered signatures are conveyed along conveyor 52, so that their glues are allowed to dry and/or cure. Conveyor 52 leads sets of dried signatures to a conveyor 54 of trimmer section 18.

Conveyor 54 leads the sets of dried/cured signatures into a trimmer unit 56 of trimmer section 18. Trimmer unit 56 trims the sets of dried/cured signatures to form documents. Conveyor 54 leads the documents out of trimmer unit 56 to a stacker unit 58. In response to signals from control system 20, stacker unit 58 selectively stacks documents from conveyor 54 into one or more groups 60a–b conveyed on a conveyor 62.

Document assembly system 10 further includes one or more divert gates, such as divert gates 64a–c shown in FIG. 1. In the preferred embodiment, control system 20 operates divert gates 64a–c to selectively divert objects in response to errors detected during assembly of documents. For example, in response to signals from control system 20, divert gate 64a selectively diverts one or more sets of gathered signatures away from conveyor 44 of binder section 14.

Also, in response to signals from control system 20, divert gate 64b selectively diverts one or more sets of bound and covered signatures away from conveyor 52 of dry cure table section 16. Similarly, in response to signals from control system 20, divert gate 64c selectively diverts one or more documents to a conveyor 65 away from stacker 58.

Moreover, document assembly system 10 includes one or more image stations, such as printers 66a and 66b shown in FIG. 1. In the preferred embodiment, control system 20 operates printer 66a to print identification information on covers of bound signatures after they exit binder unit 46 along conveyor 51. To verify proper operation of document assembly system 10, control system 20 subsequently reads the printed identification information through an optical scanner 68 from covers of documents after they exit trimmer unit 56 along conveyor 54. Control system 20 operates printer 66b to selectively print subscriber information, such as addresses and notices on covers of documents after they exit trimmer unit 56 along conveyor 54. Control system 20 is further able to operate one or more additional printers to selectively print subscriber information anywhere on or within a document.

Figure 2:
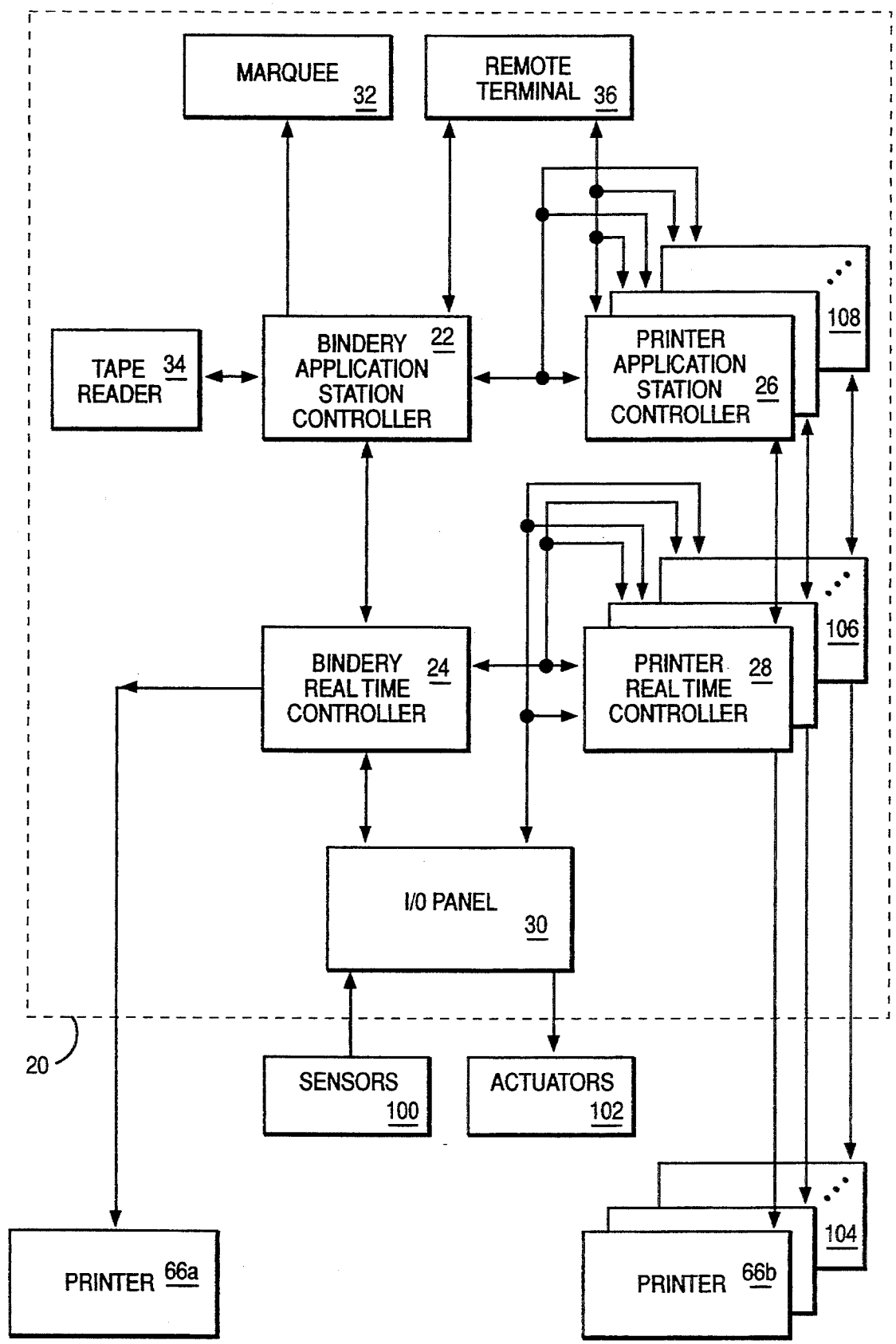
FIG. 2 is a block diagram of a control system of the document assembly system of FIG. 1

FIG. 2 is a block diagram of control system 20. Tape reader 34 is connected to BASC 22 for inputting, storing, and outputting subscriber information. Remote terminal 36 stores configuration and setup information concerning document assembly system 10. BASC 22 inputs configuration and setup information from remote terminal 36. In response to signals from BASC 22, remote terminal 36 modifies its stored configuration and setup information. Marquee 32 displays information to an operator in response to signals from BASC 22.

Remote terminal 36 operates as a remote host controller. Accordingly, remote terminal 36 includes a resident database for storing information relating to interfaces with an operator. The resident database of remote terminal 36 is accessible by remote terminal 36, BASC 22 and PASC 26.

Moreover, remote terminal 36, BASC 22 and PASC 26 each include a respective display screen and input device, such as a keyboard or pointing device, for interfacing with the operator. Through any such input device, the operator sends instructions to one or more of remote terminal 36, BASC 22 and PASC 26. For example, through the input device of remote terminal 36, the operator can modify configuration and setup information.

Through I/O panel 30, BRTC 24 inputs signals from sensors 100, including miss sensors, verify sensors, pocket sensors, and print demand sensors (not shown) as discussed further hereinbelow in connection with FIGS. 3 and 6a-b. Moreover, through I/O panel 30, BRTC 24 outputs signals to actuators 102 for selectively operating elements of document assembly system 10, including gather pockets 40a-g, cover pockets 48a-c, and divert gates 64a-c.

BASC 22 operates as a bindery host controller. Accordingly, BASC 22 outputs signals to BRTC 24 and to PASC 26 for coordinating assembly of multiple documents according to the preferred embodiment. From BRTC 24 and PASC 26, BASC 22 inputs status information relating to document assembly operations.

BRTC 24 outputs signals to printer 66a for printing identification information on covers of bound signatures after they exit binder unit 46 along conveyor 51. PRTC 28 outputs signals to respective printer 66b for selectively printing on a cover or signatures of an individual document. Status information is communicated between BRTC 24 and PRTC 28, so that such printing operations are synchronized with other operations of document assembly system 10.

PASCs 26 operates as print host controllers. Accordingly, PASC 26 outputs signals to a respective PRTC 28 for coordinating printing on multiple documents. From PRTC 28, PASC 26 inputs status information relating to printing operations. For each additional printer 104 added to document assembly system 10, an additional PRTC 106 and PASC 108 can be added to control system 20 as shown in FIG. 2.

In the preferred embodiment, BASC 22, PASC 26 and remote terminal 36 are PS/2 computers available from INTERNATIONAL BUSINESS MACHINES CORPORATION, executing C language instructions in an OS/2 1.2 operating environment. BRTC 24 and PRTC 28 are VME based multi-processor systems, executing C++ language instructions in a Realtime Multiprocessing Kernel ("RMK") operating environment available from INTERNATIONAL BUSINESS MACHINES CORPORATION. Instructions are structured as sets of communicating processes, as discussed further hereinbelow in connection with FIG. 8.

Figure 3:
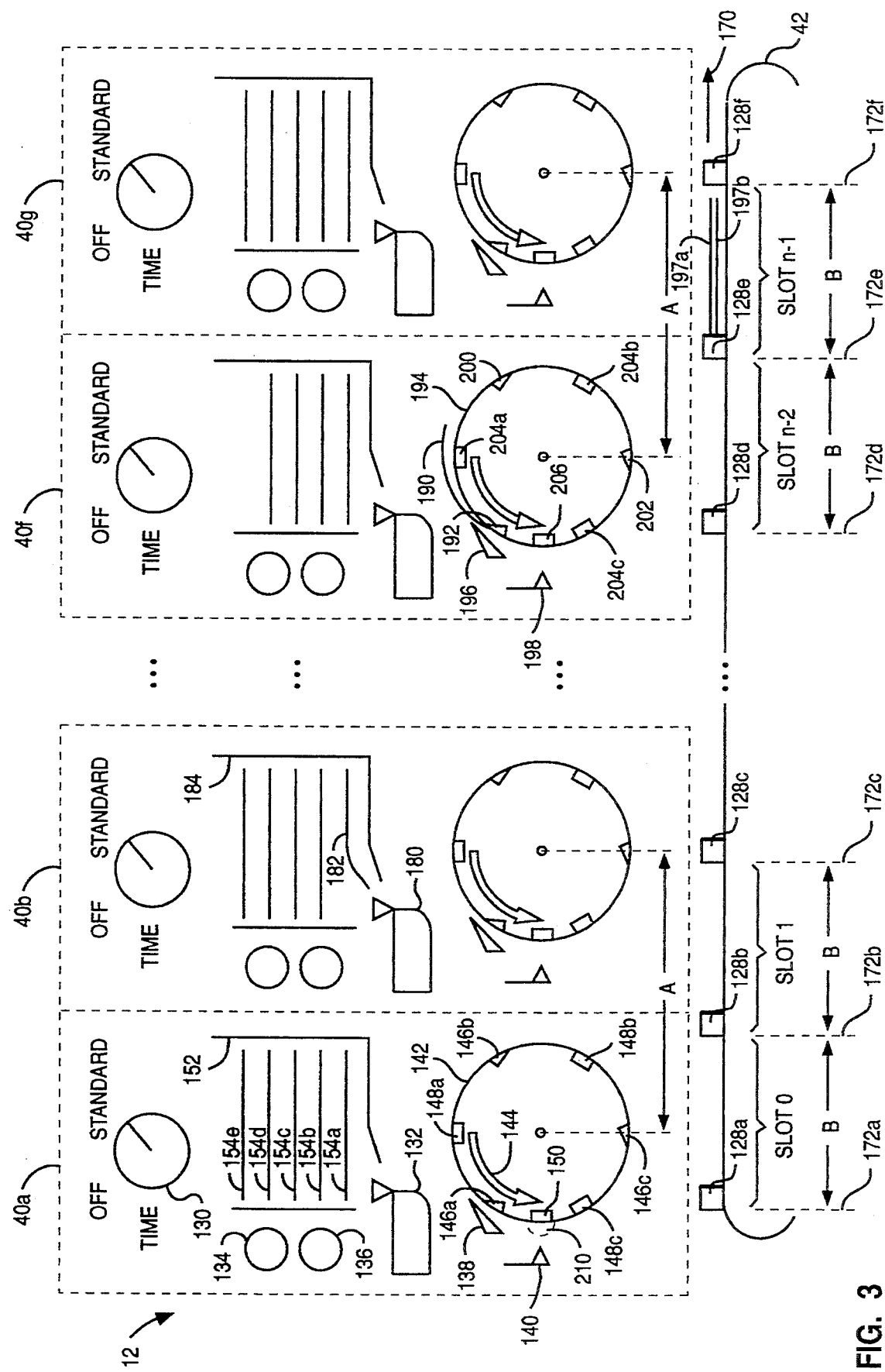
FIG. 3 is an illustration of a gather section of the document assembly system of FIG. 1.

FIG. 3 is an illustration of gather section 12. FIG. 3 shows substantially identical gather pockets 40a-b and 40f-g (indicated generally by dashed enclosures), although gather section 12 can include numerous additional gather pockets. Gather pockets 40a-b and 40f-g are disposed over conveyor 42. Conveyor 42 includes multiple substantially equally spaced pins 128a-f shown in FIG. 3, although conveyor 42 can include numerous additional pins.

Gather pocket 40a is a representative one of gather pockets 40a-b and 40f-g. Accordingly, for clarity, only gather pocket 40a is discussed in detail hereinbelow. Gather pocket 40a includes a mode device 130 for switching gather pocket 40a between "time", "off", and "standard" modes. Further, gather pocket 40a includes a vacuum device 132, a "miss" light 134, and a "double" light 136, each coupled through actuators 102 to I/O panel 30 of FIG. 2. Moreover, gather pocket 40a includes a caliper sensor 138 and a miss sensor 140, each connected as sensors 100 to I/O panel 30 of FIG. 2. In the preferred embodiment, miss sensor 140 is a photosensor.

Gather pocket 40a also includes a drum 142. In operation, drum 142 rotates in the direction indicated generally by arrow 144. Drum 142 included grippers 146a-c and respectively associated miss activation elements 148a-c. In addition, drum 142 includes an index activation element 150. In the preferred embodiment, activation elements 148a-c and 150 are reflectors. Further, gather pocket 40a includes a hopper 152. Hopper 152 holds a set of substantially identical signatures 154a-e.

Figure 4:
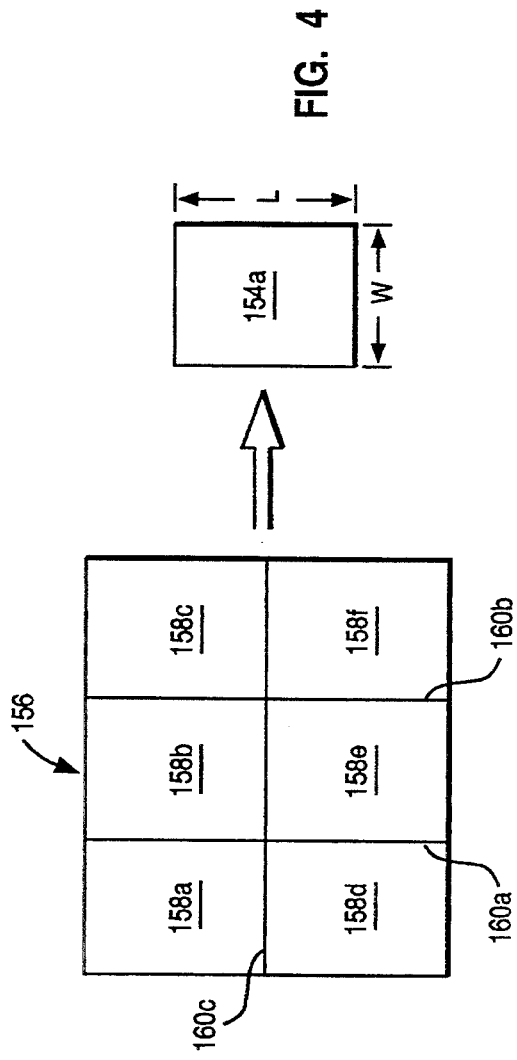
FIG. 4 is an illustration of an exemplary signature of the gather section of FIG. 3.

FIG. 4 is an illustration of exemplary signature 154a. Signature 154a is a single sheet of paper, indicated generally at 156, on which multiple pages 158a-f of a document are printed. After pages 158a-f are printed on paper 156, paper 156 is folded along lines 160a-c to form signature 154a.

As discussed further hereinabove in connection with FIG. 1, document assembly system 10 assembles a document by gathering different signatures from multiple ones of gather pockets 40a-g. Trimmer unit 56 trims sets of dried/cured signatures to form multiple sheets of paper properly oriented and sequenced within a document. Accordingly, the length L and width W of signature 154a are slightly greater than the length and width of a document in which signature 154a is to be included.

Referring again to FIG. 3, the nominal spacing between sequential ones of gather pockets 40a–g (see FIG. 1) is a distance A as shown in FIG. 3. For example, the nominal spacing between gather pockets 40a and 40b is distance A. In an exemplary embodiment, distance A is twenty-seven inches. The nominal spacing between sequential ones of pins 128a–f is a distance B as shown in FIG. 3. For example, the nominal spacing between pins 128a and 128b is distance B. In an exemplary embodiment, distance B is sixteen inches.

Multiple "slots" are defined relative to conveyor 42 and are numbered as slot 0 through slot n-1 as shown in FIG. 3, where n is the total number of defined slots. By definition, as shown in FIG. 3, each of slots 0 through n-1 has a length equal to distance B. Accordingly, $$n \geq \frac{A \cdot \text{number of gather pockets}}{B}.$$

Also, slots are defined for all conveyors of document assembly system 10.

In operation, conveyor 42 shifts pins 128a–f in the direction indicated generally by arrow 170. As shown in FIG. 3, all of pins 128a–f are simultaneously alignable with boundaries 172a–f of slots 0 through n-1. Nevertheless, pins 128a–f can be offset from boundaries 172a–f as conveyor 42 shifts pins 128a–f in the direction indicated generally by arrow 170. By suitably shifting pins 128a–f in this manner, any of pins 128a–f is alignable with any of boundaries 172a–f. The shifting of pins 128a–f does not modify the positions of slots 0 through n-1 relative to conveyor 42. Pins 128a–f are arranged in a continuous chain so that, after conveyor 42 shifts a pin across boundary 172f, conveyor 42 eventually returns the pin to entry boundary 172a. In the preferred embodiment, slot 0 of gather section 12 is an entry point for document assembly system 10 at which assembly of documents begins. In an alternative embodiment, the entry point is a different slot of gather section 12.

As shown in FIG. 3, mode device 130 is switched to a "standard" setting, so that gather pocket 40a is responsive to control signals from control system 20. Likewise, each of gather pockets 40b and 40f–g are switched to a "standard" setting. In operation, control system 20 selectively operates a gather pocket's vacuum device to pull a signature from the gather pocket's hopper. For example, referring to gather pocket 40b, control system 20 selectively operates a vacuum device 180 to pull a signature 182 from a hopper 184.

After a gather pocket's vacuum device pulls a signature from the gather pocket's hopper, the pulled signature is gripped by a gripper of the gather pocket's drum. For example, referring to gather pocket 40f, a pulled signature 190 is gripped by a gripper 192 of a drum 194. A caliper sensor 196 measures thickness of signature 190 to detect whether multiple signatures are errantly being gripped simultaneously by gripper 192. Cover pockets 48a–d (FIG. 1) operate in a similar manner. Notably, cover pockets 48a–d do not include caliper sensors.

After a signature is gripped by a gripper, the rotating drum moves the signature into a suitable position near conveyor 42. After the signature is suitably positioned near conveyor 42, the gripper releases the signature, so that the signature is placed on conveyor 42 between adjacent ones of pins 128a–f. By operating gather pockets 40a–g to selectively place signatures on conveyor 42, control system 20 selectively gathers signatures in a set to form a document. For example, in FIG. 3, signatures 197a–b are gathered in a set between pins 128e and 128f to form part or all of a particular document. In the preferred embodiment, control system 20 operates gather section 12 to selectively gather sets of signatures for multiple customized versions of one or more documents, contemporaneously.

Each gather pocket's drum is positioned proximate to an associated miss sensor. For example, drum 142 of gather pocket 40a is positioned proximate to miss sensor 140, and drum 194 of gather pocket 40f is positioned proximate to a miss sensor 198. Similar to drum 142 of gather pocket 40a, drum 194 of gather pocket 40f includes grippers 192, 200 and 202, and respectively associated miss activation elements 204a–c. Likewise, drum 194 includes an index activation element 206.

When a signature is not being gripped by a miss activation element's associated gripper, the miss activation element is not covered. For example, referring to gather pocket 40a, a signature is not being gripped by gripper 146a associated with miss activation element 148a, so that miss activation element 148a is not covered. In such a situation, the gather pocket's miss sensor detects an activation of the miss activation element when the miss activation element is positioned proximate to the miss sensor.

For example, referring to gather pocket 40a, miss sensor 140 detects an activation of miss activation element 148a when drum 142 eventually rotates miss activation element 148a into a region indicated generally by dashed enclosure 210 proximate to miss sensor 140. As shown in FIG. 3, index activation element 150 is positioned within region 210 proximate to miss sensor 140, so that miss sensor 140 detects an activation of index activation element 150. In the preferred embodiment, a miss sensor detects an activation of an activation element by detecting a reflection of light from the activation element.

When a signature is being gripped by a miss activation element's associated gripper, the miss activation element is covered by the signature. For example, referring to gather pocket 40f, signature 190 is being gripped by gripper 192 associated with miss activation element 204a, so that miss activation element 204a is covered by signature 190. In such a situation, the gather pocket's miss sensor does not detect an activation of the miss activation element, even when the miss activation element is positioned proximate to the miss sensor.

Accordingly, by monitoring the miss sensors of gather pockets 40a–g, control system 20 determines whether a signature is being gripped. By design, the index activation element is never covered, even when a signature is being gripped, such that the miss sensor always detects an activation of an index activation element positioned proximate to the miss sensor.

By definition, a cycle is an event in which conveyor 42 shifts all of pins 128a–f over the length B of a slot. Further, during each cycle, each drum rotates approximately 120 degrees. Accordingly, a gather pocket's miss sensor detects an activation of the gather pocket's index activation element once every three cycles.

Figure 5:
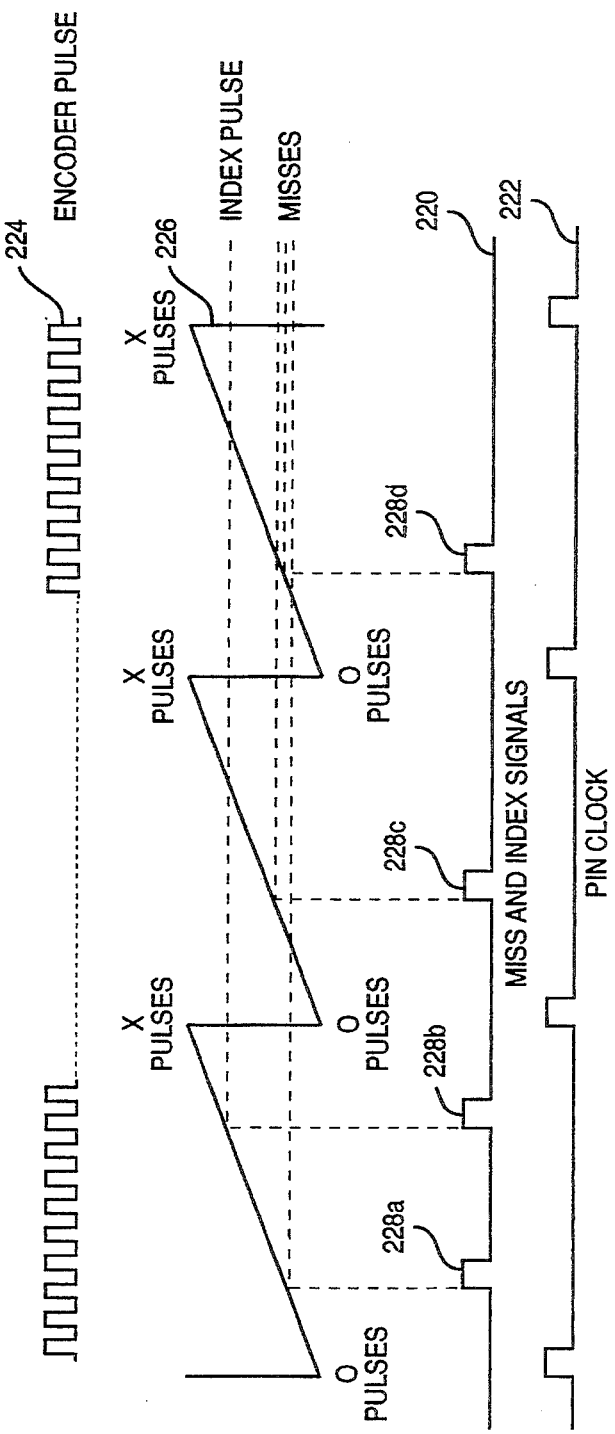
FIG. 5 is a timing diagram of signals processed by the control system of FIG. 2 according to the calibrating technique of the preferred embodiment.

FIG. 5 is a timing diagram of signals processed by control system 20 according to the calibrating technique of the preferred embodiment. From each of gather pockets 40a–g (FIG. 1), control system 20 inputs a miss sensor signal 220 through I/O panel 30 (FIG. 2). From conveyor 42 (FIG. 1), control system 20 inputs a pin clock signal 222 through I/O panel 30. Pin clock signal 222 has a positive pulse once per cycle, thereby indicating when all of pins 128a-f have been shifted by conveyor 42 over the length B of a slot.

From conveyor 42, control system 20 inputs an encoder pulse signal 224 through I/O panel 30. In response to conveyor 42 shifting all of pins 128a-f over a unit distance, encoder pulse signal 224 has a positive pulse. In an exemplary embodiment, such a unit distance is 1/720 of an inch.

As indicated by curve 226, control system 20 increments an encoder pulse count in response to each pulse of encoder pulse signal 224. Control system 20 increments the encoder pulse count from 0 pulses through x pulses, where $$x = \frac{\text{length } B \text{ of a slot}}{\text{unit distance}}.$$

For example, if B=16 inches, and if the unit distance is 1/720 of an inch, then x=11,520 pulses. A cycle is an event in which conveyor 42 shifts all of pins 128a-f over the length B of a slot; accordingly, x is a predetermined constant number of pulses output by gather section 12 per cycle, and a fraction of x pulses is linearly related to a fraction of a cycle. In response to each positive pulse of pin clock signal 222, control system 20 resets the encoder pulse count to 0 pulses and continues incrementing the encoder pulse count in response to each pulse of encoder pulse signal 224.

Through miss sensor signal 220, a gather pocket's miss sensor outputs a positive pulse each time it detects an activation of any of the gather pocket's activation elements, including the index activation element and the miss activation elements. As shown in FIG. 5, miss sensor signal 220 illustrates a situation where no signatures are being gripped by the gather pocket's drum, so that miss sensor signal 220 has four positive pulses 228a-d per 360 degree rotation (three cycles) of the gather pocket's drum.

If no signatures are being gripped by the gather pocket's drum, miss sensor signal 220 has one positive pulse per cycle attributable to an activation of a miss activation element, such as pulses 228a, 228c and 228d. Moreover, miss sensor signal 220 has one positive pulse per three cycles attributable to an activation of an index activation element, such as pulse 228b. Thus, for one of every three cycles, miss sensor signal 220 has two positive pulses (one pulse attributable to an activation of a miss activation element and another pulse attributable to an activation of an index activation element), such as pulses 228a and 228b.

Accordingly, by analyzing the timing of pulses 228a-d relative to curve 226, control system 20 identifies pulses 228a, 228c and 228d as being attributable to a miss sensor's detecting activations of miss sensor elements. Moreover, as illustrated in FIG. 5, pulses 228a, 228c and 228d occur at similar encoder pulse counts, thereby according with the substantially equal spacing of miss activation elements around a gather pocket's drum.

In this manner, control system 20 relates pulses 228a-d to the encoder pulse count of curve 226. Significantly, the encoder pulse count of curve 226 is related to pin clock signal 222 and to physical positions of pins and slots of conveyor 42. Moreover, pulses 228a-d are related to physical positions of activation elements around a gather pocket's drum. Accordingly, by relating pulses 228a-d to the encoder pulse count of curve 226, control system 20 advantageously relates physical positions of activation elements around a gather pocket's drum to physical positions of pins and slots of conveyor 42.

Notably, each drum of cover pockets 48a-d has two substantially evenly spaced miss activation elements and no index activation element. Accordingly, a cycle for cover pockets 48a-d is an event in which each drum rotates approximately 180 degrees, so that each cover pocket's miss sensor detects an activation of a miss activation element once per cycle.

Moreover, control system 20 inputs a respective pin clock signal from different conveyors of document assembly system 10. Also, control system 20 inputs a respective encoder pulse signal from different conveyors of document assembly system 10. Accordingly, control system 20 adjusts to differences in physical positions of pins and slots of different conveyors.

For example, from each of cover pockets 48a-d (FIG. 1), control system 20 inputs a miss sensor signal through I/O panel 30 (FIG. 2). From conveyor 50, control system 20 inputs a pin clock signal and an encoder pulse signal through I/O panel 30. In response to such signals, control system 20 relates physical positions of activation elements around drums of cover pockets 48a-d to physical positions of pins and slots of conveyor 50 (FIG. 1) according to the technique discussed hereinabove in connection with FIG. 5 for gather pockets.

FIGS. 6a-b are illustrations of activation elements 240 and 242 located by control system 20 according to the calibrating technique of the preferred embodiment. In the preferred embodiment, activation elements 240 and 242 are reflectors. An entry sensor 244 is positioned above activation element 240 near entry boundary 172a of slot 0 and is connected to I/O panel 30 of FIG. 2. A verify sensor 246 is positioned above activation element 242 near a boundary 248 of slot 2 and is connected to I/O panel 30 of FIG. 2. In the preferred embodiment, entry sensor 244 and verify sensor 246 are photosensors.

Entry sensor 244 detects an activation of activation element 240 when no signatures are interposed between entry sensor 244 and activation element 240. Likewise, verify sensor 246 detects an activation of activation element 242 when no signatures are interposed between verify sensor 246 and activation element 242. In the preferred embodiment, sensors 244 and 246 detect activations of activation elements 240 and 242, respectively, by detecting reflections of light from the activation elements.

Referring to FIG. 6a, when at least one signature 250 is interposed between entry sensor 244 and activation element 240, entry sensor 244 ceases detecting an activation of activation element 240. Accordingly, by monitoring signals from entry sensor 244 relative to curve 226, control system 20 determines a point 252 within a cycle where signature 250 is initially interposed between entry sensor 244 and activation element 240.

In this manner, control system 20 relates the signals from entry sensor 244 to the encoder pulse count of curve 226. Significantly, the encoder pulse count of curve 226 is related to physical positions of pins and slots of conveyor 42. Moreover, when at least one signature such as signature 250 crosses boundary 172a to enter slot 0, the signals from entry sensor 244 are related to a physical position of activation element 240 within slot 0. Accordingly, by relating the signals from entry sensor 244 to the encoder pulse count of curve 226, control system 20 advantageously relates the physical position of activation element 240 and entry sensor 244 to physical positions of pins and slots of conveyor 42.

Similarly, referring to FIG. 6b, when conveyor 42 eventually shifts signature 250 to be interposed between verify sensor 246 and activation element 242, verify sensor 246 ceases detecting an activation of activation element 242, thereby verifying the presence of a signature in slot 2. Accordingly, by monitoring signals from verify sensor 246, control system 20 determines a point 254 within a cycle where signature 250 is initially interposed between verify sensor 246 and activation element 242. As discussed hereinabove in connection with FIG. 5, by relating the signals from verify sensor 246 to the encoder pulse count of curve 226, control system 20 advantageously relates the physical position of activation element 242 and verify sensor 246 to physical positions of pins and slots of conveyor 42. In an analogous manner, control system 20 relates the physical position of any print demand sensor (not shown) and its associated activation element to physical positions of pins and slots.

Multiple verify sensors (such as verify sensor 246) and their respectively associated activation elements (such as activation element 242) are positioned at various slots (such as slot 2 in FIGS. 6a–b) of conveyors of document assembly system 10 to detect the presence of signatures in slots. Also, entry sensors (such as entry sensor 244) and their respectively associated activation elements (such as activation element 240) are positioned at entry slots (such as slot 0 in FIGS. 6a–b) of conveyors of document assembly system 10 to detect the entry of signatures onto conveyors.

FIGS. 7a–d are a flow chart of the technique for calibrating a document assembly system according to the preferred embodiment. A number of factors contribute to the difficulty in calibrating document assembly system 10. For example, an operator can vary positions of each pocket's grippers relative to slots in order to accommodate different sizes and positioning of signatures. Moreover, slot width is not necessarily an even multiple of pocket spacing.

As discussed hereinabove in connection with FIGS. 3–6b, in calibrating document assembly system 10, control system 20 automatically calibrates (1) positions of various entry sensors, verify sensors, print demand sensors (not shown), and exit sensors (not shown) along the document assembly line relative to slots and (2) positions of each pocket's miss activation elements relative to slots.

In order to automatically calibrate document assembly system 10, control system 20 inputs configuration information concerning document assembly system 10. Such configuration information includes: the number and sizes of slots in each section of document assembly system 10; the number, types and nominal spacing of pockets in document assembly system 10; the resolution of encoder signals for each section of document assembly system 10; divert gate locations cover offset; and an initial estimate of each sensor's slot position within a specified section of document assembly system 10.

After control system 20 inputs the configuration information, a teach command is given to control system 20 for initiating the automatic calibration of document assembly system 10. The teach command indicates a number of trials for control system 20 to average for the calibration. In response to the teach command, control system 20 executes base tracking operations for assembling a set of documents. The base tracking operations include queue manager, sensor manager, divert gate manager, and pocket control operations. The base tracking operations do not include document initiation/termination, stacker interface, and printer interface operations.

Figure 7A:
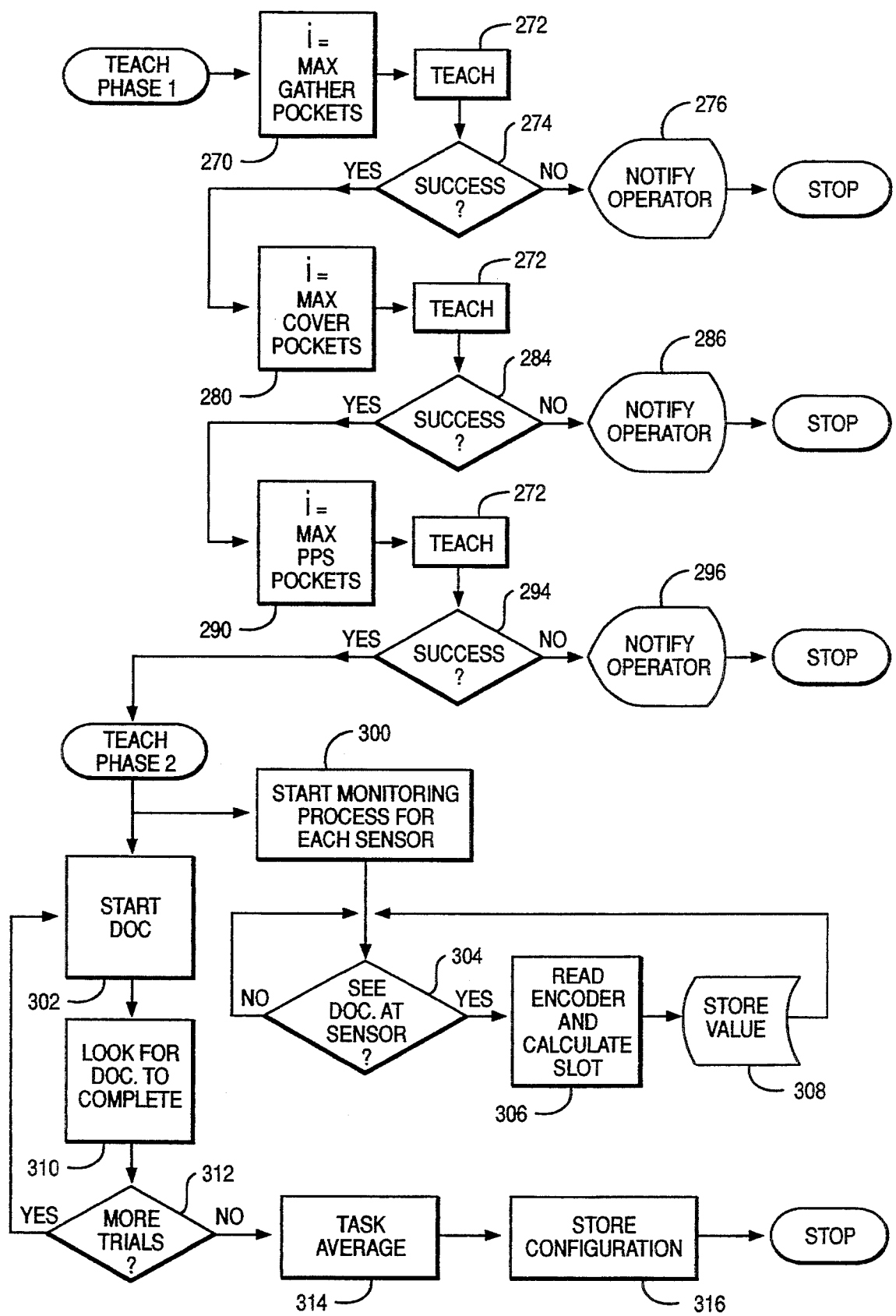
FIGS. 7a–d are a flow chart of the technique for calibrating a document assembly system according to the preferred embodiment.

Referring to FIG. 7a, the calibration technique includes a Phase-1 and a Phase-2. Phase-1 automatically relates miss activation elements to slots according to the techniques discussed further hereinabove in connection with FIGS. 3–5. During Phase-1, control system 20 operates document assembly system 10 with no signatures being gathered. Phase-2 automatically relates sensors and their respectively associated activation elements to slots according to the techniques discussed further hereinabove in connection with FIGS. 6a–b. During Phase-2, control system 20 operates document assembly system 10 with signatures being gathered for at least one test document.

In the preferred embodiment, control system 20 executes Phase-1 prior to Phase-2. In an alternative embodiment, control system 20 executes Phase-2 prior to Phase-1. In another alternative embodiment, control system 20 executes either Phase-1 or Phase-2 and not the other.

Phase-1 begins at a step 270, where control system 0 initializes an index i to the total number of gather pockets. Then, control system 20 executes a teach process 272 for calibrating miss sensors of each such pocket as discussed further hereinbelow in connection with FIG. 7b.

At a decision block 274, control system 20 determines whether teach process 272 successfully calibrated each pocket's miss activation elements. If teach process 272 was not successful, then at a step 276 control system 20 notifies the operator that calibration was not fully successful, and execution stops. If teach process 272 was successful, then execution continues to a step 280.

At step 280, control system 20 initializes index i to the total number of cover pockets. Then, control system 20 executes teach process 272 for calibrating miss sensors of each such pocket as discussed further hereinbelow in connection with FIG. 7b. At a decision block 284, control system 20 determines whether teach process 272 successfully calibrated each pocket's miss activation elements. If teach process 272 was not successful, then at a step 286 control system 20 notifies the operator that calibration was not fully successful, and execution stops. If teach process 272 was successful, then execution continues to a step 290.

At step 290, control system 20 initializes index i to the total number of perpendicular print station ("PPS") pockets (not shown). Then, control system 20 executes teach process 272 for calibrating miss sensors of each such pocket as discussed further hereinbelow in connection with FIG. 7b. At a decision block 294, control system 20 determines whether teach process 272 successfully calibrated each pocket's miss activation elements. If teach process 272 was not successful, then at a step 296 control system 20 notifies the operator that calibration was not fully successful, and execution stops. If teach process 272 was successful, then execution continues to Phase-2.

Phase-2 begins at steps 300 and 302, where control system 20 begins executing two parallel processes. At step 300, control system 20 starts its monitoring process for each entry sensor, verify sensor, and print demand sensor (not shown) of document assembly system 10. At a decision block 304, control system 20 determines whether any sensor ceases detecting an activation of its associated activation element, thereby indicating the presence of a signature in a slot. Execution loops at decision block 304 until control system 20 detects the presence of a signature in a slot.

After control system 20 detects the presence of a signature in a slot, at a step 306 control system 20 reads the encoder count and determines the section, slot, and offset relative to the slot of the sensor and its associated activation element in the manner discussed further hereinabove in connection with FIGS. 6a–b. At a next step 308, control system 20 stores the determined section, slot, and offset. After step 308, execution returns to decision block 304.

At step 302, control system 20 initiates the assembly by document assembly system 10 of a test document. During assembly of the test document, control system 20 monitors the test document's slot location as the test document is shifted through the document assembly line. Control system 20 locates entry sensors, verify sensors, and print demand sensors (not shown) by detecting when each such sensor ceases detecting an activation of its associated activation element. By knowing the section and slot in which the test document is located, control system 20 likewise knows the slot in which a sensor ceases detecting an activation of its associated activation element.

At a next step 310, control system 20 waits for document assembly system 10 to complete assembly of the test document. After document assembly system 10 completes assembly of the test document, control system 20 determines at a decision block 312 whether more trials are to be performed. If more trials are to be performed, then execution returns to step 302. If more trials are not to be performed, then control system 20 executes a task average process 314 discussed further hereinbelow in connection with FIG. 7d. After executing task average process 314, control system 20 stores the determined configuration information at a step 316, and execution stops.

Figure 7B:
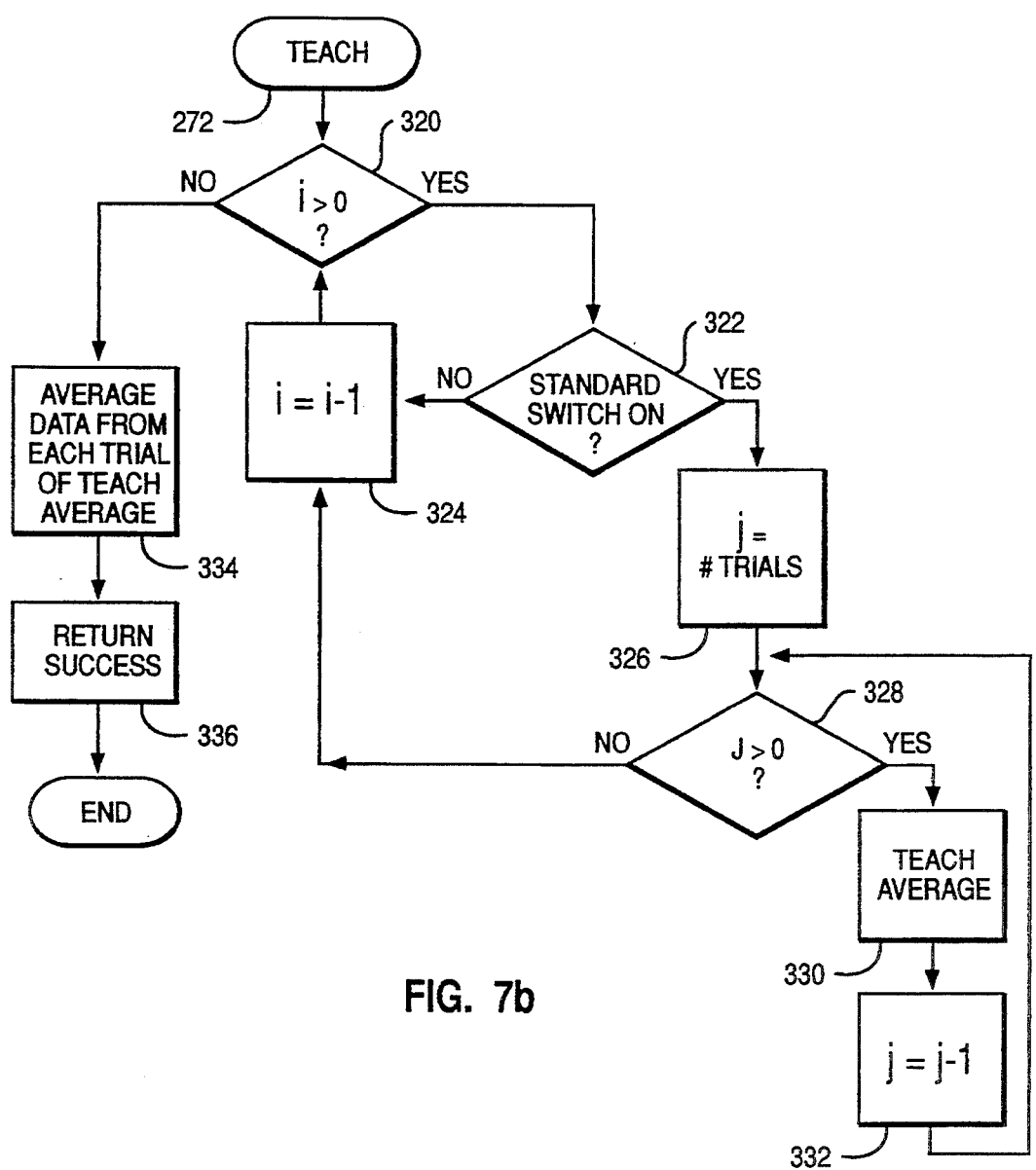

FIG. 7b is a flow chart of teach process 272. In Phase-1, document assembly system 10 operates with no signatures being gathered so that all miss activation elements are uncovered. Notably, control system 20 calibrates pockets in order of their proximity to a conveyor's entry boundary (such as entry boundary 172a of conveyor 42). Control system 20 uses calibrations of each pocket's miss activation elements as a basis for calibrating subsequent pockets.

Referring to FIG. 7b, teach process 272 (FIG. 7a) begins at a decision block 320 where control system 20 determines whether index i is greater than 0. If index i is greater than 0, then control system 20 determines at a decision block 322 whether the mode device of pocket i is switched to "standard" mode. If the mode device of pocket i is not switched to "standard" mode, then control system decrements the value of index i at a step 324, and execution returns to decision block 320.

If control system 20 determines at decision block 322 that the mode device of pocket i is switched to "standard" mode, then at a step 326 control system 20 initializes an index j to a preselected number of trials. After step 326, control system 20 determines at a decision block 328 whether index j is greater than 0. If index j is greater than 0, then control system 20 executes a teach average process 330 discussed further hereinbelow in connection with FIG. 7c, decrements the value of index j at a step 332, and returns to decision block 328. If control system 20 determines at decision block 328 that index j is not greater than 0, then execution continues to step 324.

If control system 20 determines at decision block 320 that index i is not greater than 0, then at a step 334 control system averages data from each trial of teach average process 330. After step 334, control system 20 returns an indication of success at a step 336.

Figure 7C:
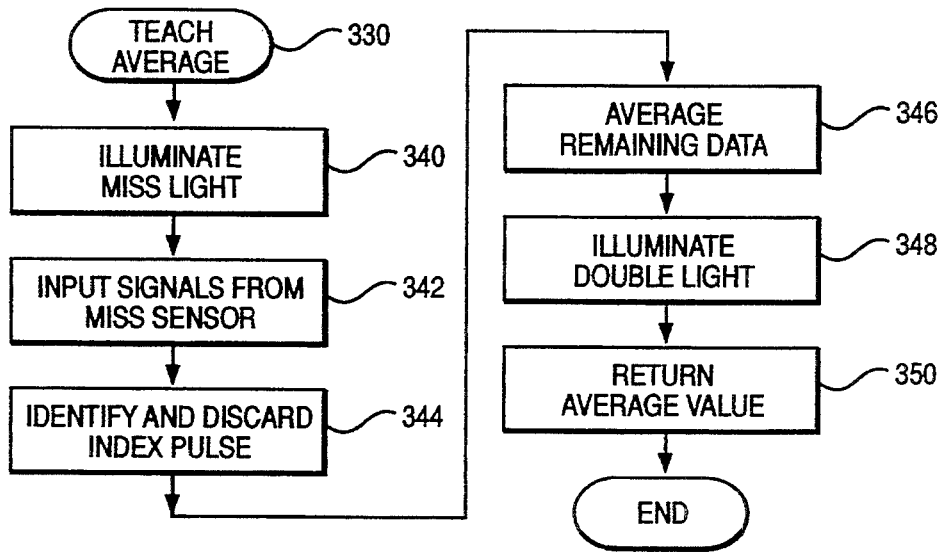

Referring to FIG. 7c, teach average process 330 (FIG. 7b) begins at a step 340 where control system 20 illuminates the miss light of pocket i to provide a visual indication to the operator of which pocket is being calibrated. At a next step 342, control system 20 inputs signals from the miss sensor of pocket i as discussed further hereinabove in connection with FIGS. 3–5. Then, at a step 344, control system 20 identifies and discards the pulse attributable to the pocket's index activation element. In the preferred embodiment, control system 20 disregards step 344 for pockets (such as cover pockets) having no index activation element.

At a next step 346, control system 20 averages the remaining pulses attributable to the pocket's miss activation elements. After step 346, at a step 348 control system 20 illuminates the "double" light of pocket i to provide a visual indication to the operator of which pockets have been calibrated. Then, at a step 350, control system 20 returns the averaged value determined at step 346.

Figure 7D:
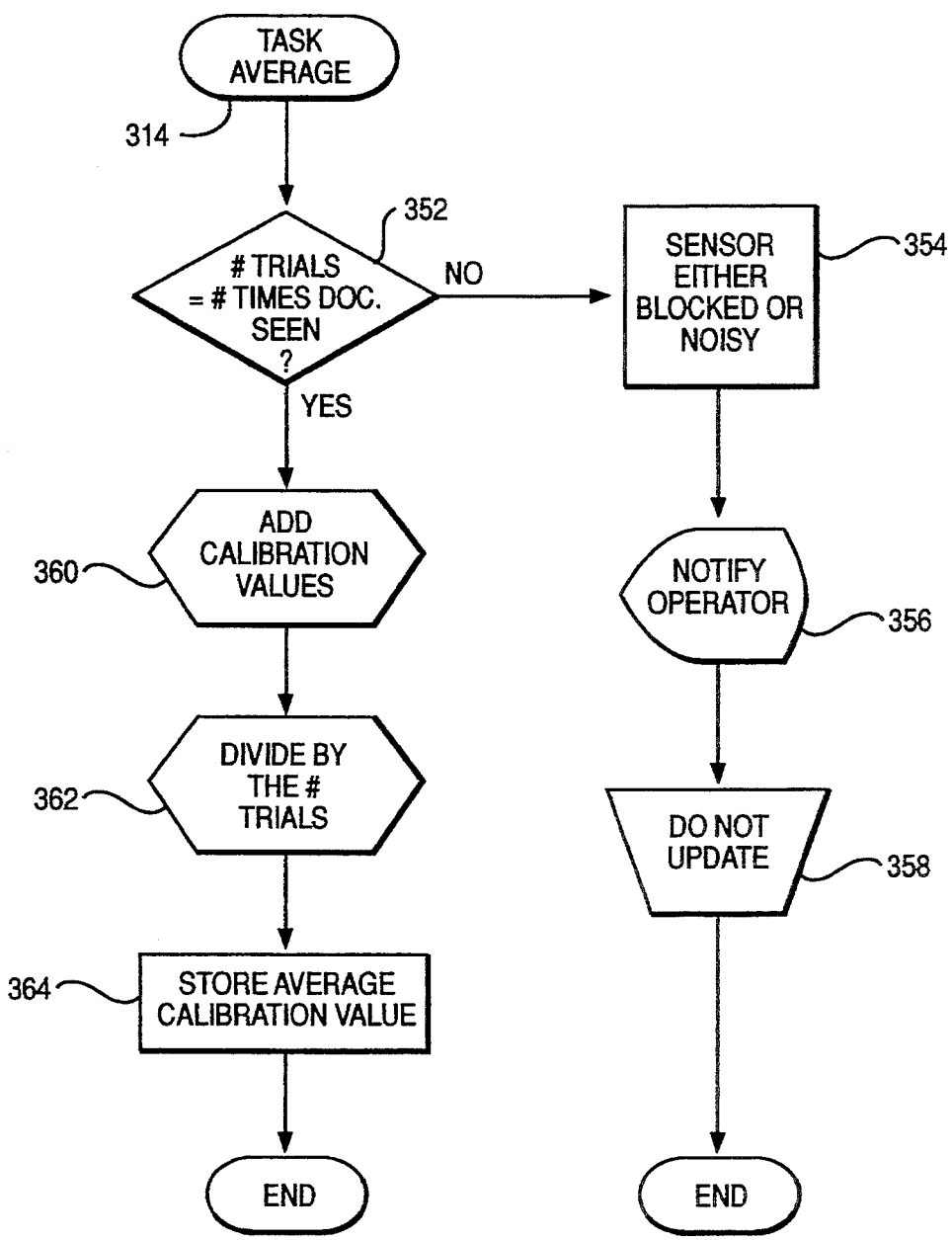

Referring to FIG. 7d, task average process 314 (FIG. 7a) begins at a decision block 352 where control system 20 determines whether a sensor detected assembly of a test document for each trial. Control system 20 assembles a number of test documents equal to the number of specified trials. Accordingly, if the sensor failed to detect a test document for each trial, then at a step 354 control system sets a "blocked or noisy" flag associated with the failing sensor. At a step 356, control system 20 notifies the operator of any such failure. In that situation, control system 20 does not store information from the sensor into the configuration, as indicated in FIG. 7d by step 358. Previously stored information is retained for any sensor that fails to successfully calibrate.

If control system 20 determines at decision block 352 that the sensor successfully detected a test document for each trial, then control system 20 determines the average offset between the sensor and a slot by adding all tested offsets (step 360) and dividing by the number of trials (step 362). Finally, at a step 364, control system stores the average offset together with other configuration information.

Figure 8:
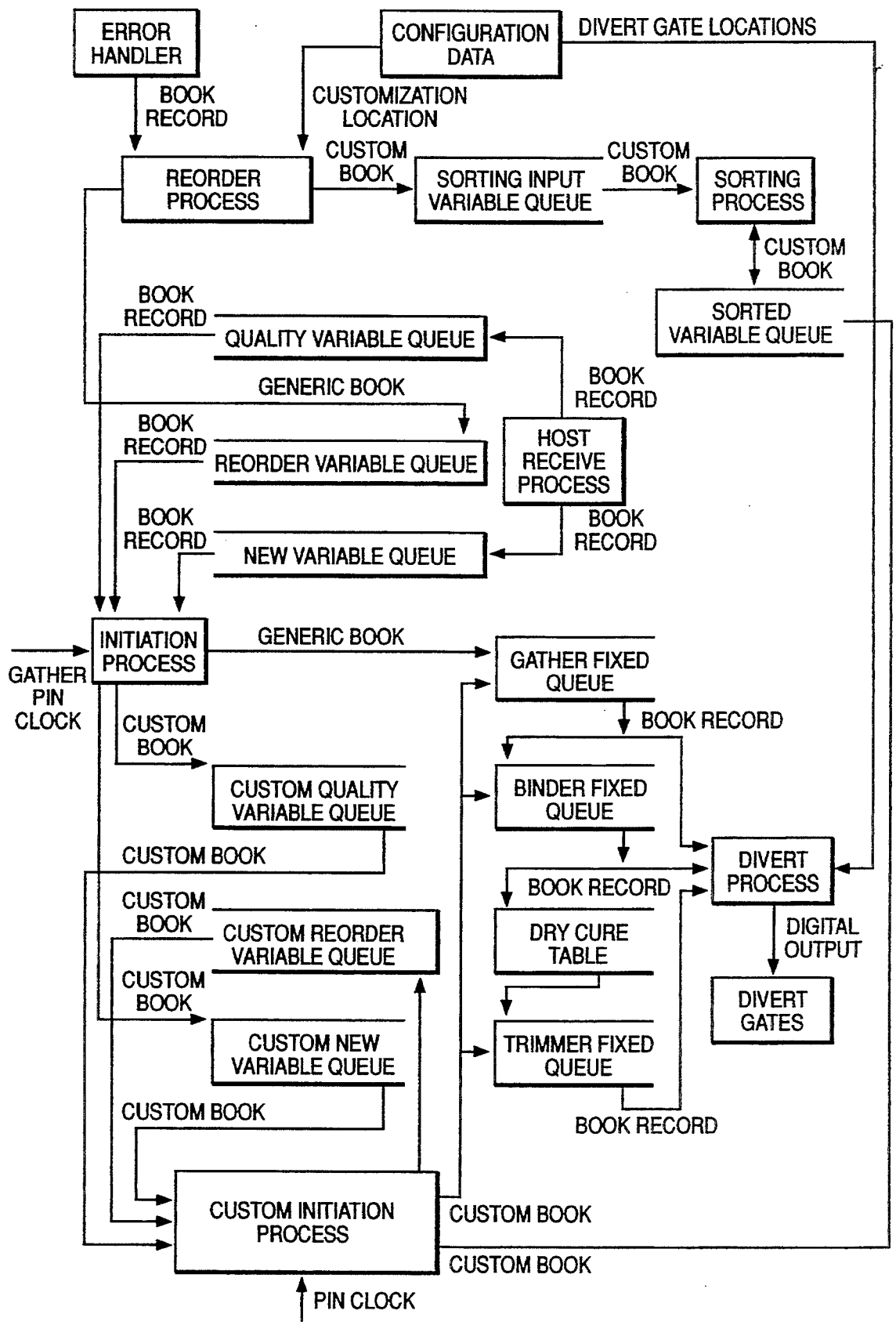
FIG. 8 is data flow diagram of a technique for operating a document assembly system according to the control system of FIG. 2.

FIG. 8 is data flow diagram of a technique for operating document assembly system 10 according to control system 20. The data flow diagram includes multiple queues, each operating as a first-in first-out buffer. Control system 20 represents all slots of the gather section as logical book record locations in a gather fixed queue. Likewise, control system 20 represents all slots of the binder section, and the trimmer section as logical book record locations in a binder fixed queue and a trimmer fixed queue, respectively. Control system 20 represents signature sets along conveyor 52 of dry cure section 16 as logical book records, each associated with a unique document identification number, in the dry cure table of FIG. 8. If no signatures are present at a slot, then the slot's corresponding logical book record location is occupied by a null record. If one or more signatures is present at a slot, then the slot's corresponding logical book record location is occupied by the logical book record of the document being assembled in the slot.

Accordingly, output from the gather fixed queue is directed to the front of the binder fixed queue. Output of the binder fixed queue is directed to the front of the dry cure table, and output of the dry cure table is directed to the front of the trimmer fixed queue. Output of the trimmer fixed queue is directed to the divert process for representation as being suitably diverted by divert gate 64c (FIG. 1). Similarly, output of the gather fixed queue is optionally directed to the divert process for representation as being suitably diverted by divert gate 64a (FIG. 1). Likewise, output of the binder fixed queue is optionally directed to the divert process for representation as being suitably diverted by divert gate 64b (FIG. 1). Divert gate locations are specified to the divert process as slot locations from configuration data.

Figure 9A:
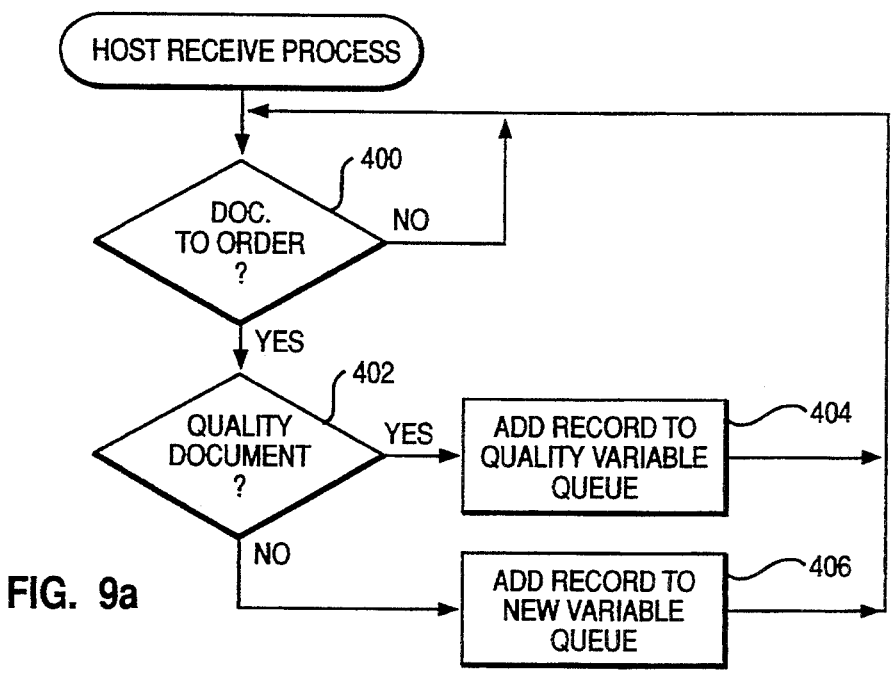
FIGS. 9a–e are flow charts of processes of the operating technique of FIG. 8.

FIGS. 9a–e are flow charts of processes of the operating technique of FIG. 8. Referring to FIG. 9a, the host receive process begins at a decision block 400, where execution loops until a document is to be ordered according to an initial document order. When a document is to be ordered, control system 20 determines at a decision block 402 whether the document to be ordered is a quality document. Quality documents are discussed further hereinbelow in connection with FIGS. 11a–13b.

If the document to be ordered is a quality document, then at a step 404 control system 20 adds the quality document's logical book record to the quality variable queue. After step 404, execution returns to decision block 400. If control system 20 determines at decision block 402 that the document to be ordered is not a quality document, then at a step 406 control system 20 adds the document's logical book record to the new variable queue. After step 406, execution returns to decision block 400.

Figure 9B:
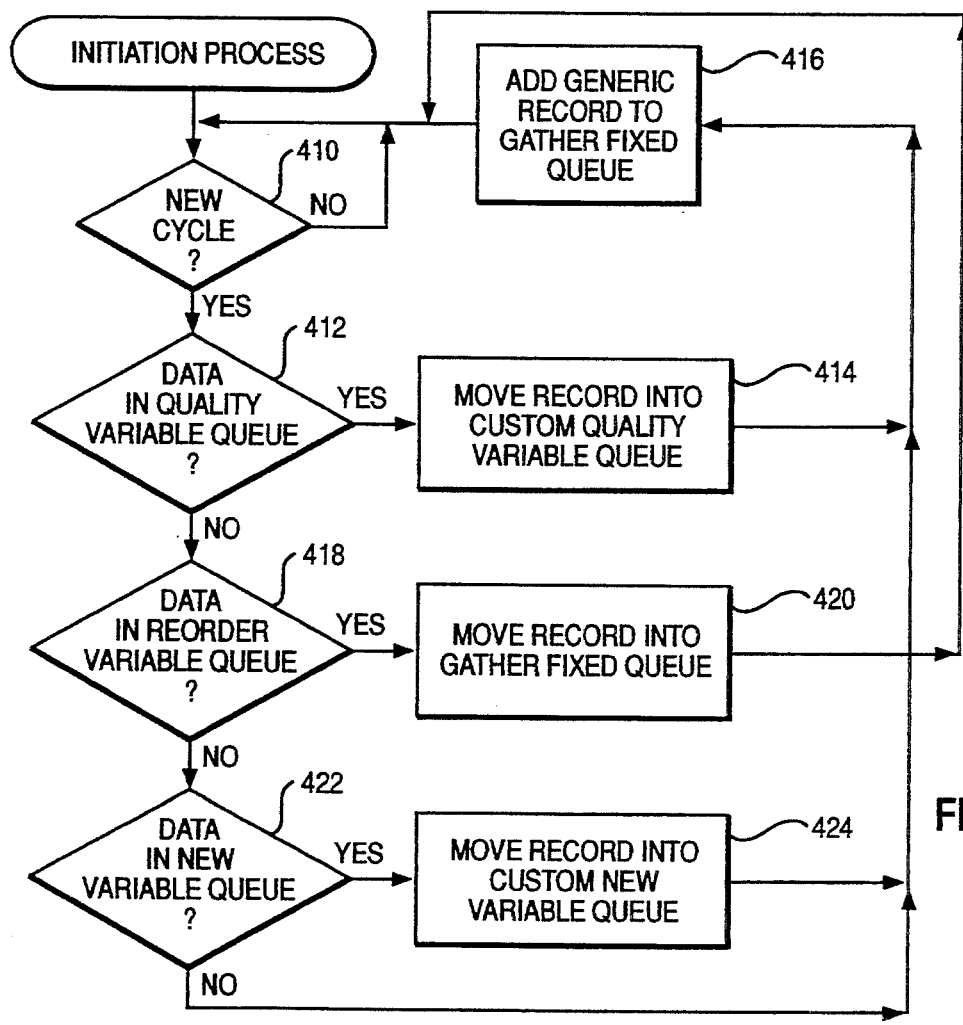

Referring to FIG. 9b, the initiation process begins at a decision block 410, where execution loops until a new cycle occurs for gather section 12. When a new cycle occurs, control system 20 determines at a decision block 412 whether a logical book record exists in the quality variable queue. If a logical book record exists in the quality variable queue, then control system 20 moves the logical book record into the custom quality variable queue at a step 414. After step 414, execution continues to a step 416 where control system adds a generic document record to the gather fixed queue. Execution then returns to decision block 410.

If control system 20 determines at a decision block 412 that no logical book record exists in the quality variable queue, then control system 20 determines at a decision block 418 whether a logical book record exists in the reorder variable queue. If a logical book record exists in the reorder variable queue, then control system 20 moves the logical book record into the gather fixed queue at a step 420. After step 420, execution returns to decision block 410.

If control system 20 determines at a decision block 418 that no logical book record exists in the reorder variable queue, then control system 20 determines at a decision block 422 whether a logical book record exists in the new variable queue. If a logical book record exists in the new variable queue, then control system 20 moves the logical book record into the custom new variable queue at a step 424. After step 424, execution continues to step 416.

Figure 9C:
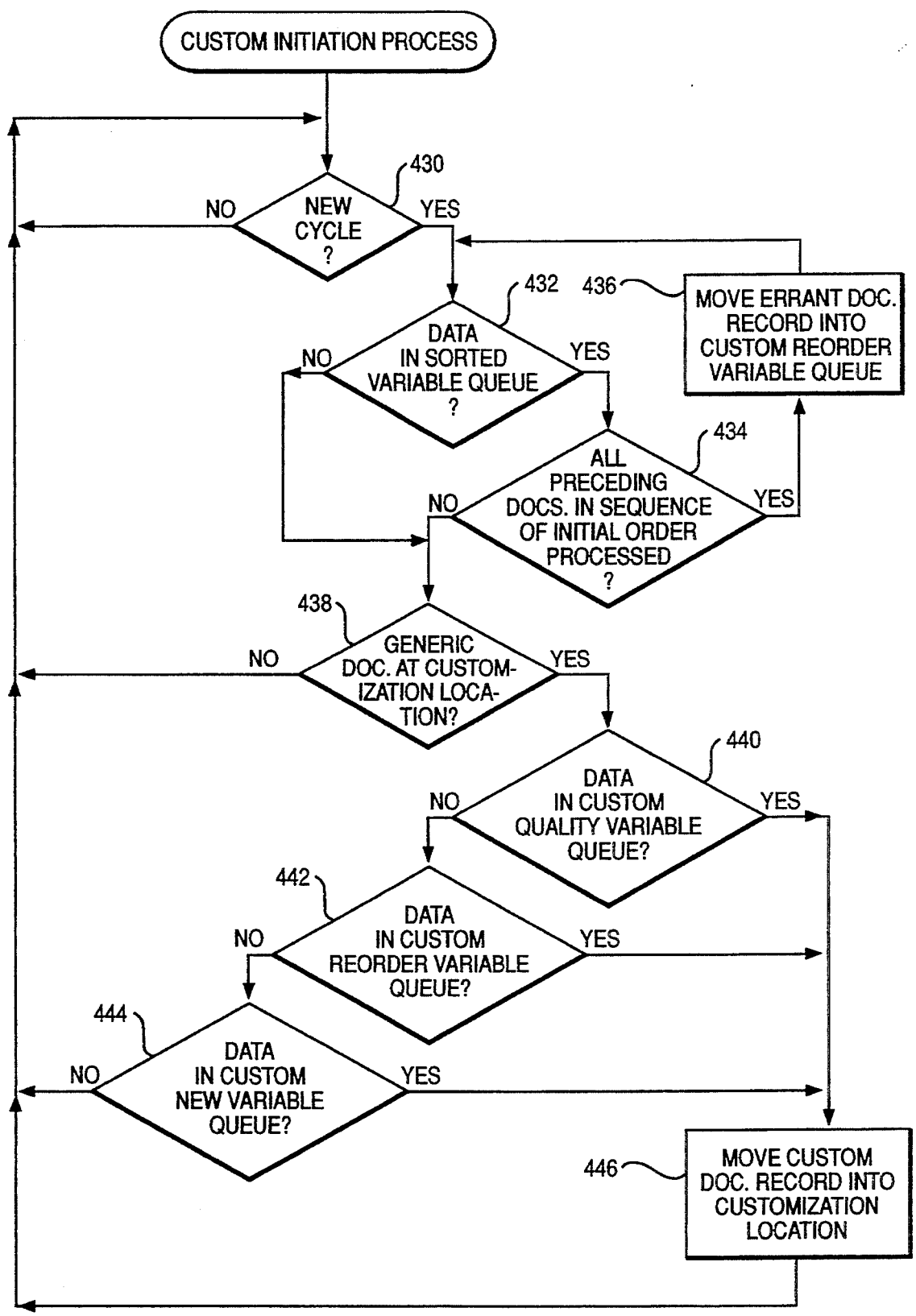

Referring to FIG. 9c, the custom initiation process begins at a decision block 430, where execution loops until a new cycle occurs. When a new cycle occurs, control system 20 determines at a decision block 432 whether a logical book record exists in the sorted variable queue. In a significant aspect of the preferred embodiment, if a logical book record exists in the sorted variable queue, then control system 20 determines at a decision block 434 whether all preceding documents in the sequence of the initial document order have been processed so that such preceding documents are no longer being assembled by document assembly system 10.

If control system 20 determines at decision block 434 that all preceding documents in the sequence of the initial document order have been processed, then execution continues to a step 436 where control system 20 moves the logical book record from the sorted variable queue into the custom reorder variable queue. Accordingly, at step 436, control system 20 reorders document assembly system 10 to assemble a replacement for an errantly assembled custom document. Execution then returns to decision block 432.

If control system 20 determines at decision block 432 that no logical book record exists in the sorted variable queue, or if control system 20 determines at decision block 434 that not all preceding documents in the sequence of the initial document order have been processed, then execution continues to a decision block 438 where control system 20 determines whether a generic document is present at the customization location. The customization location is a predetermined slot of document assembly system 10 at which assembly of custom documents begins. A "custom" document is a generic document having content not common to all documents of a document edition. Control system 20 automatically determines the customization location in response to setup and configuration information.

If control system 20 determines at decision block 438 that a generic document is not present at the customization location, then execution returns to decision block 430. If a generic document is present at the customization location, then execution continues to a decision block 440 where control system 20 determines whether a logical book record exists in the custom quality variable queue. If not, then execution continues to a decision block 442 where control system 20 determines whether a logical book record exists in the custom reorder queue. If not, then execution continues 34 to a decision block 444 where control system 20 determines whether a logical book record exists in the custom new variable queue. If not, then execution returns to decision block 430.

If control system 20 determines at decision block 440 that a logical book record exists in the custom quality variable queue, or if control system 20 determines at decision block 442 that a logical book record exists in the custom reorder variable queue, or if control system 20 determines at decision block 444 that a logical book record exists in the custom new variable queue, then execution continues to a step 446. At step 446, control system 20 moves the custom document's logical book record to replace a generic logical book record at the customization record location. The customization record location can be located in either the gather fixed queue, the binder fixed queue, or the trimmer fixed queue, depending upon which section includes the customization location of document assembly system 10. Accordingly, at decision block 430, execution loops until a new cycle occurs for the section of document assembly system 10 having the customization location. After step 446, execution returns to decision block 430.

Figure 9D:
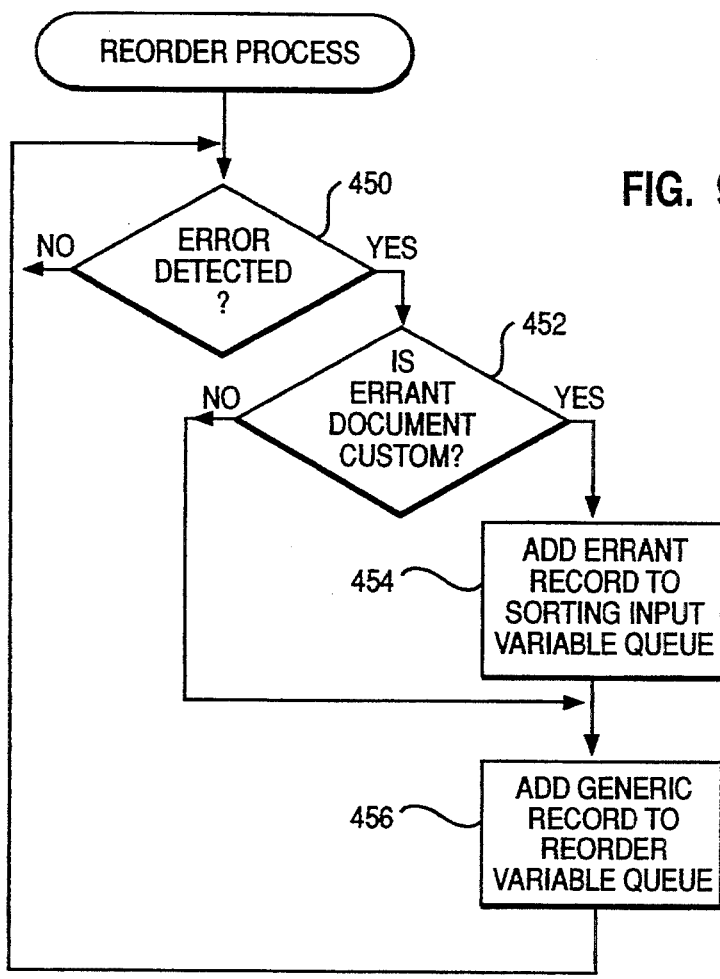

Referring to FIG. 9d, the reorder process begins at a decision block 450 where execution loops until an error in assembly of a document is detected and processed by the error handler (FIG. 8). When an error is detected and processed, control system 20 determines at a decision block 452 whether the errantly assembled document is at or beyond the customization location. If the errantly assembled document is at or beyond the customization location, then execution continues to a step 454 where control system 20 adds the errantly assembled document's logical book record to the sorting input variable queue.

After step 454, execution continues to a step 456 where control system 20 adds a generic logical book record to the reorder variable queue. By adding a generic logical book record to the reorder variable queue, control system plans for a generic document to be present at the customization location when control system 20 reorders document assembly system 10 to assemble a replacement for the errantly assembled document (in the manner discussed hereinabove in connection with decision block 442 and step 446 of FIG. 9c). After step 456, execution returns to decision block 450. If control system 20 determines at decision block 452 that the errantly assembled document is before the customization location, then execution continues to step 456.

Figure 9E:
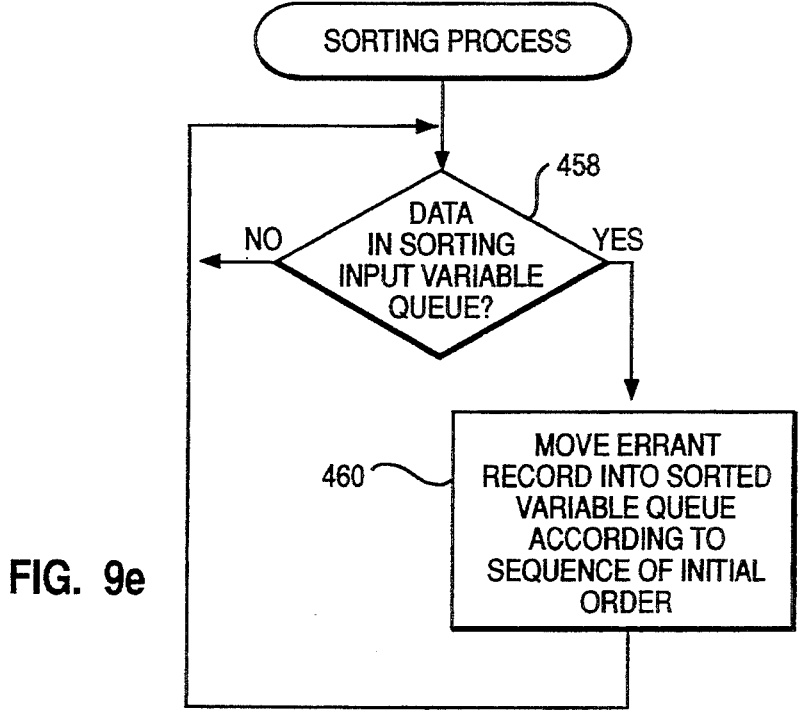

Referring to FIG. 9e, the sorting process begins at a decision block 458 where execution loops until control system 20 determines that a logical book record exists in the sorting input variable queue. When a logical book record exists in the sorting input variable queue, execution continues to a step 460 where control system 20 moves the errantly assembled document's logical book record into the sorted variable queue according to the sequence of the initial document order. Accordingly, control system 20 is able to rearrange the order of logical book records in the sorted variable queue so that document assembly system 10 assembles replacements for the errantly assembled documents according to the sequence of the initial document order.

Figures 10B, 10C:
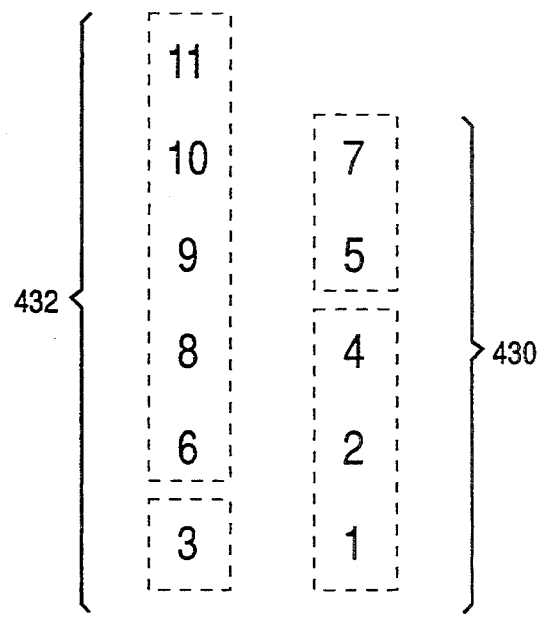

FIGS. 10a–c are illustrations of an exemplary operation of document assembly system 10 according to the operating technique of FIG. 8. FIG. 10a illustrates the status of various documents in slots K1 through (K1+12) during multiple cycles K2 through (K2+22) in response to an initial order for the sequence of custom documents-1, 2, 3, 4, 5, 6, 7, 8, 9, 10 and 11. In the exemplary operation illustrated by FIG. 10a, the customization location is slot (K1+5).

Initially, all slots of document assembly system 10 are empty. Where document assembly system 10 is operated at 100% capacity, control system 20 initiates assembly of a generic document at the entry location (slot 0 of gather section 12) of document assembly system 10 in response to each cycle. Referring to FIG. 10a, control system 20 initiates assembly of a generic document G at slot (K1+0) during cycle (K2+0).

In response to each additional cycle, control system 20 initiates assembly of an additional generic document at slot (K1+0). Accordingly, at cycle (K2+1), generic documents are being assembled by document assembly system 10 at slots (K1+0) and (K1+1). In response to additional cycles, the generic document initiated at slot (K1+0) during cycle (K2+0) eventually propagates through the slots until it reaches the customization slot (K1+5) during cycle (K2+5).

When the generic document initiated at slot (K1+0) during cycle (K2+0) reaches the customization slot (K1+5) during cycle (K2+5), control system 20 orders document assembly system 10 to begin customizing the generic document as custom document-1. In response to additional cycles, custom document-1 continues propagating through the slots, and document assembly system 10 begins customizing additional generic documents as shown in FIG. 10a as custom documents-1, 2, 3, and 4.

During assembly of a document, an error might occur, such as a signature being improperly fed to a slot. As discussed further hereinabove in connection with FIGS. 3–6b, control system 20 detects an improperly assembled document in response to signals from one or more miss sensors, entry sensors, verify sensors, and caliper sensors. In the preferred embodiment, an improperly assembled document is diverted at the earliest possible divert gate.

For example, the triangular border at slot (K1+5) during cycle (K2+8) indicates that custom document-4 was subject to an error in assembly at slot (K1+5) during cycle (K2+8). Accordingly, custom document-4 is diverted at the earliest possible divert gate, which is located after slot (K1+8) in the example of FIG. 10a. Notably, documents are subject to errors in a random order independent of the initial document order.

For example, the triangular border at slot (K1+12) during cycle (K2+12) indicates that custom document-1 was subject to an error in assembly at slot (K1+12) during cycle (K2+12). Although document assembly system 10 initiated assembly of custom document-1 prior to custom document-4, custom document-4 was subject to an error in assembly prior to custom document-1. In a significant aspect of the preferred embodiment, control system 20 reorders document assembly system 10 to assemble replacements for the errantly assembled custom documents according to their sequence in the initial document order.

By assembling replacements for the errantly assembled custom documents according to their sequence in the initial document order, the replacements can be more readily and reliably rejoined with the initial document order as discussed further hereinbelow in connection with FIGS. 10b–c. In this manner, document assembly system 10 advantageously assists in maintaining the initial presorting of documents to preserve postage savings for bulk mailings, even where replacement documents are assembled. Moreover, document assembly system 10 does not purge properly assembled documents in order to assemble a replacement for an errantly assembled document. Further, document assembly system 10 does not stop the operation of its document assembly line in order to assemble a replacement for an errantly assembled document.

As discussed further hereinabove in connection with decision block 434 of FIG. 9c, control system 20 achieves this advantage by imposing a condition that all preceding documents in the sequence of the initial document order be processed (so that such preceding documents are no longer being assembled by document assembly system 10) prior to reordering document assembly system 10 to assemble a replacement for an errantly assembled custom document.

For example, since custom document-1 is not preceded by any other documents, control system 20 reorders document assembly system 10 to assemble a replacement for custom document-1 at the earliest opportunity, as indicated in FIG. 10a by the circular boundary at slot (K1+5) during cycle (K2+13). Moreover, control system 20 advantageously reorders document assembly system 10 to assemble a replacement for custom document-1 beginning at a point along the document assembly line after the entry point of document assembly system 10.

By beginning at a point after the entry point, the replacement for custom document-1 is located more proximately to the original position of custom document-1 in the initial document order. In the preferred embodiment, control system 20 reorders document assembly system 10 to assemble a replacement for custom document-1 beginning at the customization point, so that the replacement for custom document-1 is located as proximately as possible to the original position of custom document-1 in the initial document order.

Similarly, the triangular border at slot (K+12) during cycle (K2+13) indicates that custom document-2 was subject to an error in assembly at slot (K+12) during cycle (K2+13). Since custom document-2 is preceded only by custom document-1, and since the original custom document-1 itself is no longer being assembled by document assembly system 10 during cycle (K2+13), control system 20 reorders document assembly system 10 to assemble a replacement for custom document-2 as indicated in FIG. 10a by the circular boundary at slot (K1+5) during cycle (K2+14).

Since custom document-4 is preceded by custom documents-1, 2 and 3, and since slot (K1+5) is empty at cycle (K2+16), control system 20 reorders document assembly system 10 to assemble a replacement for custom document-4 as indicated in FIG. 10a by the circular boundary at slot (K1+5) during cycle (K2+17).

Referring to FIGS. 10b–c, control system 20 readily reassigns replacement documents to their respective mailing groups. According to the example of FIG. 10a, control system 20 operates divert gate 64c (FIG. 1) to divert a replacement set 430 having replacements for custom documents-1, 2, 4, 5 and 7 to conveyor 65 (FIG. 1) according to the sequence of the initial document order. Document assembly system 10 outputs a set 432 of original custom documents-3, 6, 8, 9, 10 and 11 to conveyor 62 according to the sequence of the initial document order.

FIG. 10c lists instructions to group a total of four custom documents-1, 2, 3 and 4 into a mailing set I. Moreover, FIG. 10c lists instructions to group a total of seven custom documents-5, 6, 7, 8, 9, 10 and 11 into a mailing set II. In response to such instructions, control system 20 readily reassigns replacement documents to their respective mailing sets.

For example, control system 20 determines that the only properly assembled member of mailing set I in set 432 is original custom document-3, which is three short of the total number of documents in mailing set I. Since replacement set 430 accords with the sequence of the initial document order, control system 20 readily reassigns the first three replacements in replacement set 430 to complete mailing set I in combination with original custom document-3.

Similarly, control system 20 determines that the only properly assembled members of mailing set II in set 432 are original custom documents-6, 8, 9, 10 and 11, which are two short of the total number of documents in mailing set II. Since replacement set 430 accords with the sequence of the initial document order, control system 20 readily reassigns the next two replacements in replacement set 430 to complete mailing set II in combination with original custom documents-6, 8, 9, 10 and 11.

Significantly, for a perfect bindery system such as document assembly system 10, it is impractical to accurately determine whether a particular empty slot of a section (such as dry cure section 16) of the perfect bindery line results (1) from the asynchronous operation of different sections or (2) from an error along the perfect bindery line. By comparison, synchronously operated stitched bindery systems typically fail to present such a problem. In such a stitched bindery system, multiple signatures are stapled rather than glued. Advantageously, control system 20 tracks the order of documents along the perfect bindery line and suitably reorders documents along a single path between two points, so that additional paths and equipment are not required to be added to a conventional perfect bindery line in order to suitably reorder documents.

Figure 11A:
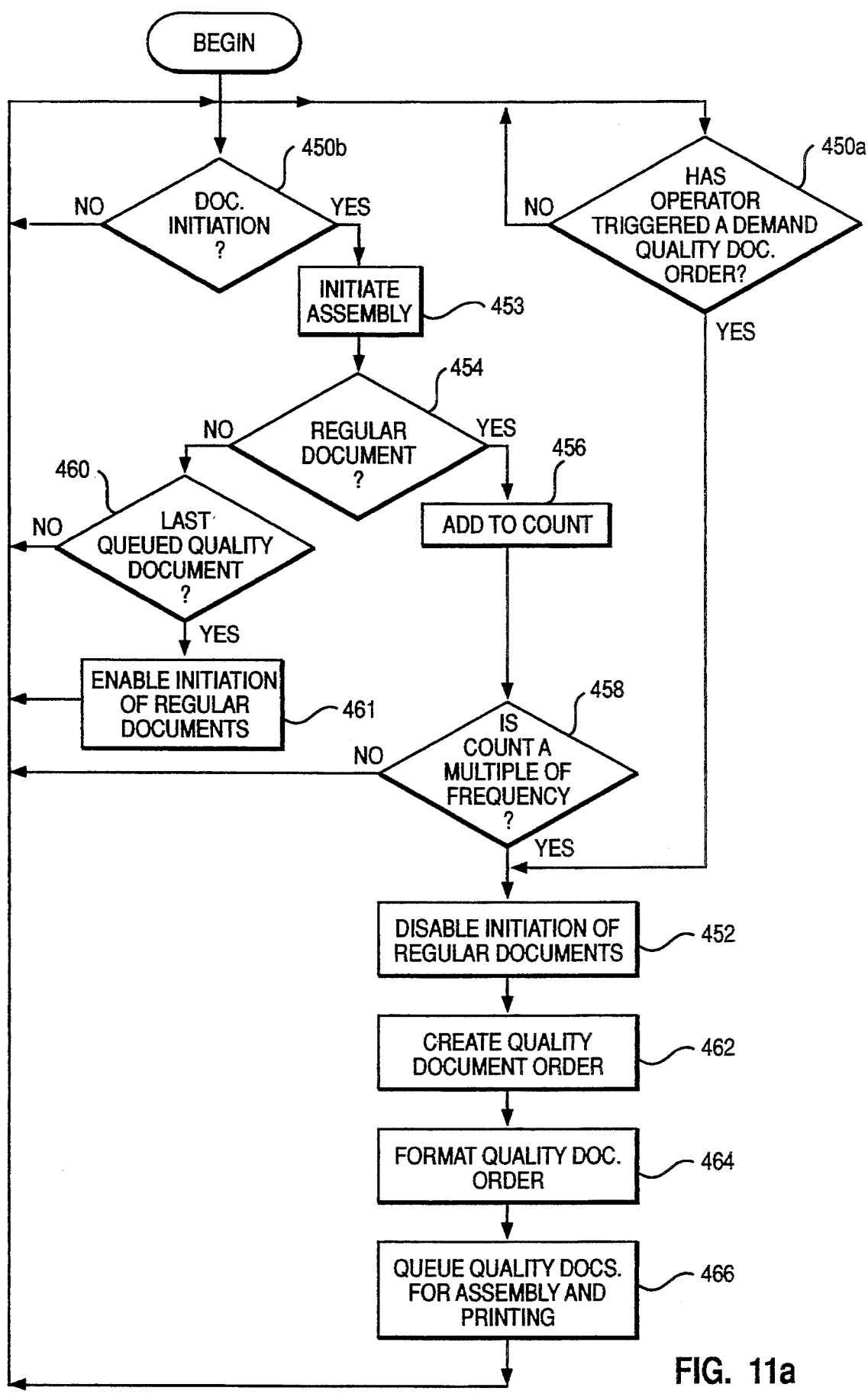
FIGS. 11a–c are a flow chart of a technique for monitoring a document assembly system according to the control system of FIG. 2.
Figure 11B:
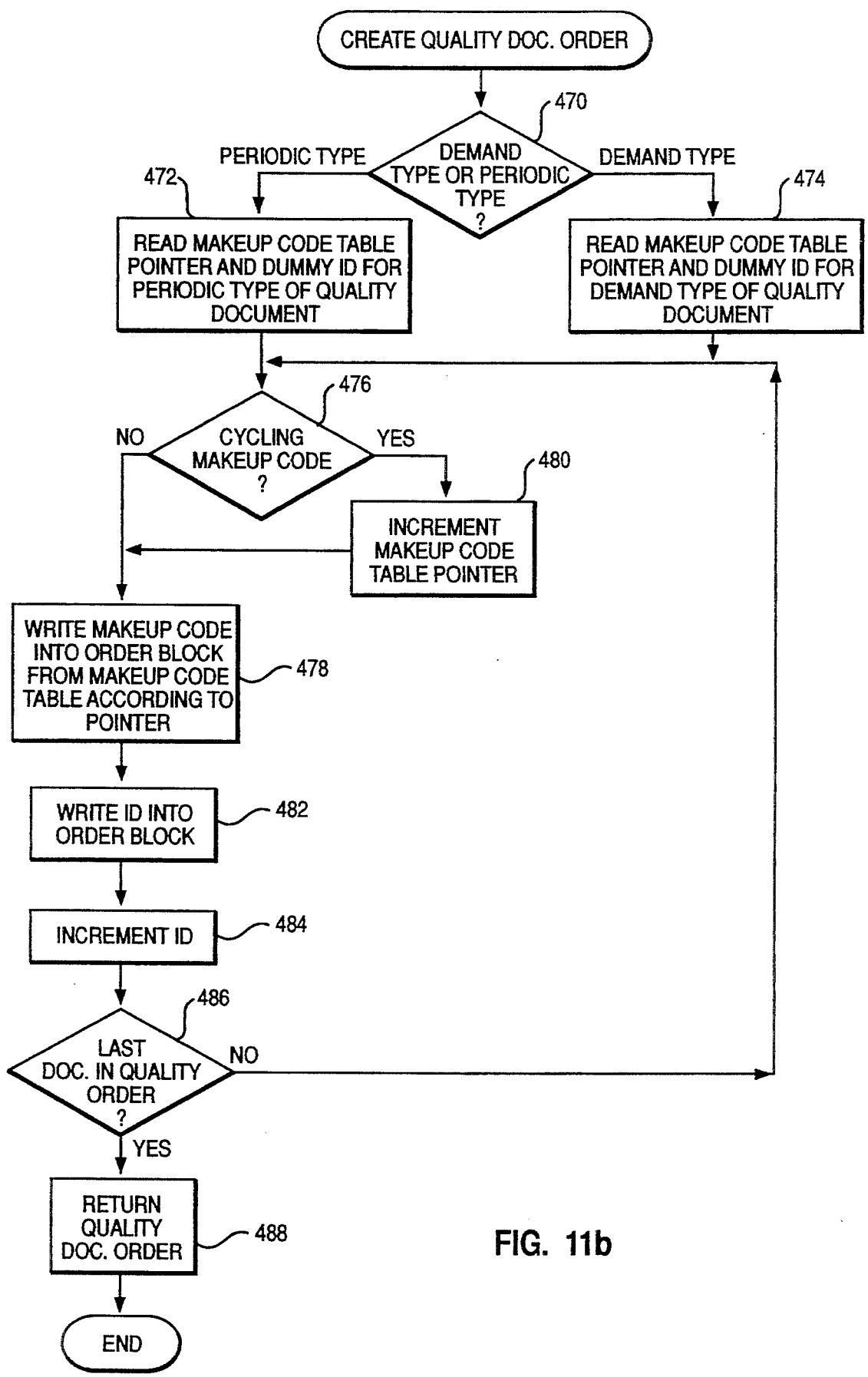
Figure 11C:
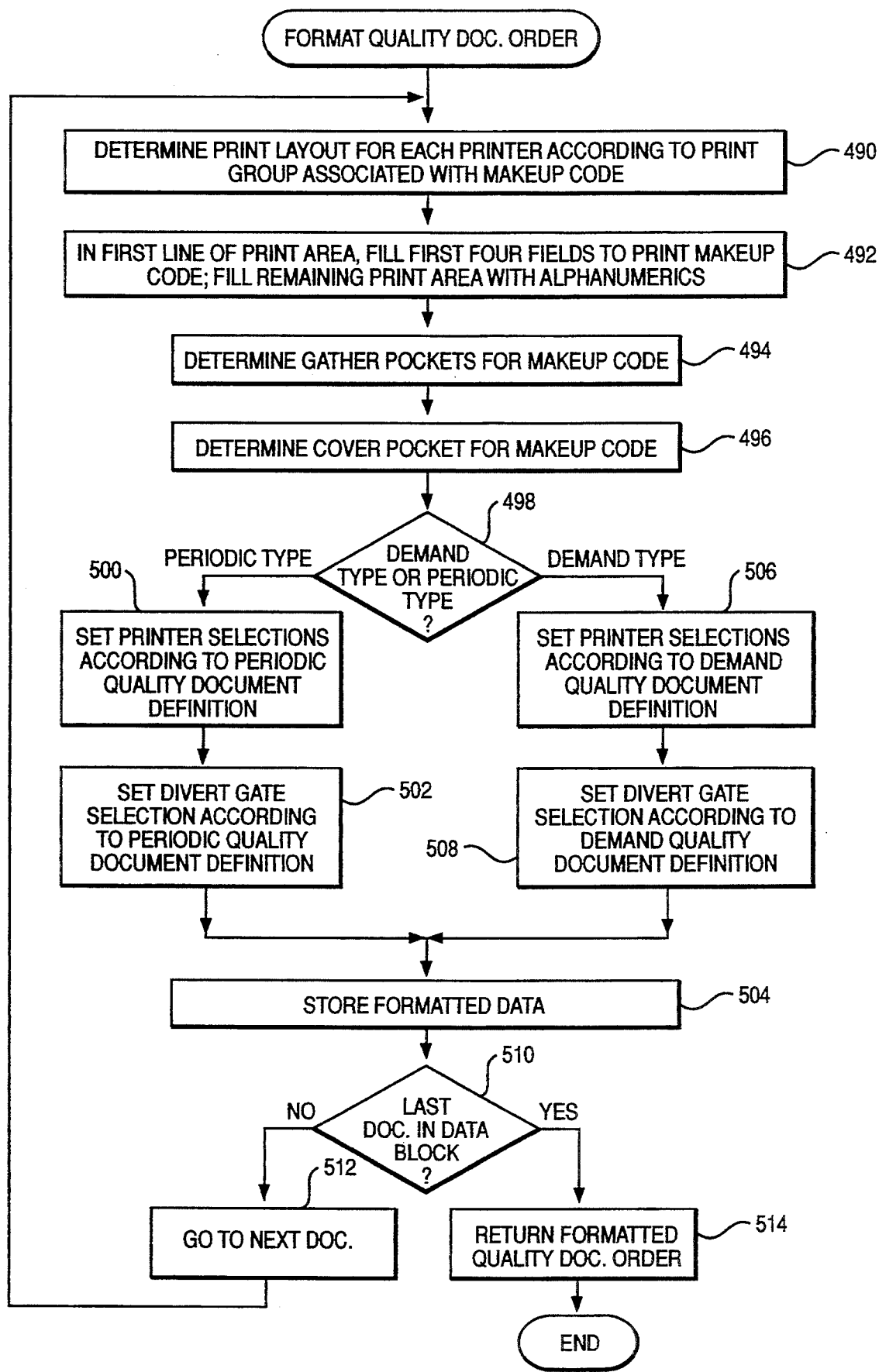

FIGS. 11a–c are a flow chart of a technique for monitoring document assembly system 10 according to control system 20. In the course of assembling a set of regular documents on document assembly system 10, control system 20 advantageously supports the assembly of supplemental ("quality") documents in order to monitor proper assembly and quality of the regular documents being assembled. In a demographic controlled document assembly system, documents are customized so that a document's type is identified by a makeup code discussed further hereinbelow in connection with FIG. 12a.

Control system 20 operates document assembly system 10 to assemble quality documents in response to two types of orders: (1) manual orders placed on demand by an operator and (2) periodic orders automatically placed by control system 20. Each type of order has its own parameter definition information. For example, the operator can specify that periodically ordered quality documents print at all configured printers even while manually ordered documents are specified to print at selected ones of the printers.

Accordingly, control system 20 supports several configurable attributes of quality documents which can be specified by the operator. These attributes are (1) the makeup code definitions for the contents of quality documents to be assembled, (2) the number of quality documents to be assembled as part of each quality document order, (3) whether to periodically initiate assembly of one or more quality documents automatically and, if so, the number ("frequency") of regular documents to assemble before periodically initiating a quality document order (if the operator specifies 0 number of regular documents to assemble, then periodic initiation is disabled), (4) the list of configured printers to print on each quality document, (5) the divert gate at which each quality document is to be diverted, and (6) whether to print a fact sheet for each assembled quality document. Advantageously, by allowing the operator to specify a divert gate and printers, signatures are reusable if the divert gate is located prior to binder section 14 and if the signatures are not printed upon. Periodically ordered quality documents are the only type of quality documents having a frequency attribute.

Control system 20 inputs operator specified initial values for the quality document parameters. Control system 20 accepts modifications to any parameter during assembly of a document edition. After control system 20 stores such modifications, the modifications are effective when control system 20 initiates the next quality document order. Moreover, control system 20 preserves initial values and modifications thereto, so that both initial values and modifications thereto are reusable. Modifications made during assembly of a document edition are effective only for the remainder of the assembly of the document edition.

Referring to FIG. 11*a*, execution begins in parallel at decision blocks 450*a* and 450*b*. At decision block 450*a*, execution loops until control system 20 determines that the operator has manually placed a quality document order. If the operator manually places a quality document order, execution continues to a step 452.

At decision block 450*b*, execution loops until control system 20 determines that assembly of a document is to be initiated, as discussed further hereinabove in connection with FIG. 8. If assembly of a document is to be initiated, execution continues to a step 453 where control system 20 initiates assembly of the document. After step 453, execution continues to a decision block 454. At decision block 454, control system 20 determines whether the initiated document is a regular document.

If the initiated document is a regular document, then execution continues to a step 456 where control system 20 increments a count of regular documents. After step 456, control system 20 determines at a decision block 458 whether the count is a multiple of the operator-specified frequency for quality document orders periodically placed by control system 20. If the count is a multiple of the operator-specified frequency, then execution continues to step 452. If the count is not a multiple of the operator-specified frequency, then execution returns to decision blocks 450*a* and 450*b*.

If control system 20 determines at decision block 454 that the initiated document is not a regular document, then execution continues to a decision block 460. At decision block 460, control system 20 determines whether assembly of the last queued quality document has been initiated. If not, then execution returns to decision blocks 450*a* and 450*b*. If assembly of the last queued quality document has been initiated, then execution continues to a step 461 where control system 20 reenables further initiation of regular documents. After step 461, execution returns to decision blocks 450*a* and 450*b*.

Referring to step 452, control system 20 disables further initiation of regular document orders until all ordered quality documents are initiated. Moreover, manually ordered quality documents have priority over periodically ordered quality documents, so that control system 20 inhibits the initiation of periodically ordered quality documents until all manually ordered documents are initiated.

By inhibiting lower priority documents, a contiguous set of quality documents is achievable, even if the quality document order is large and time consuming to create. Such contiguousness of quality documents is helpful in maintaining the frequency of periodically ordered quality documents. Also, the contiguousness helps the operator recognize when a quality document order has been fulfilled, particularly where quality documents include no identification information. Control system 20 gives manually ordered quality documents priority over periodically ordered quality documents, since an operator is likely to physically wait for assembly of manually ordered quality documents.

After step 452, control system 20 creates a quality document order at step 462 as discussed further hereinbelow in connection with FIG. 11*b* and FIG. 12*d*.

After step 462, control system 20 formats the quality document order at a step 464 as discussed further hereinbelow in connection with FIG. 11*c* and FIG. 12*e*. At a next step 466, control system 20 queues quality documents for assembly and printing. After step 466, execution returns to decision blocks 450*a* and 450*b*.

Figures 12A, 12B, 12C:
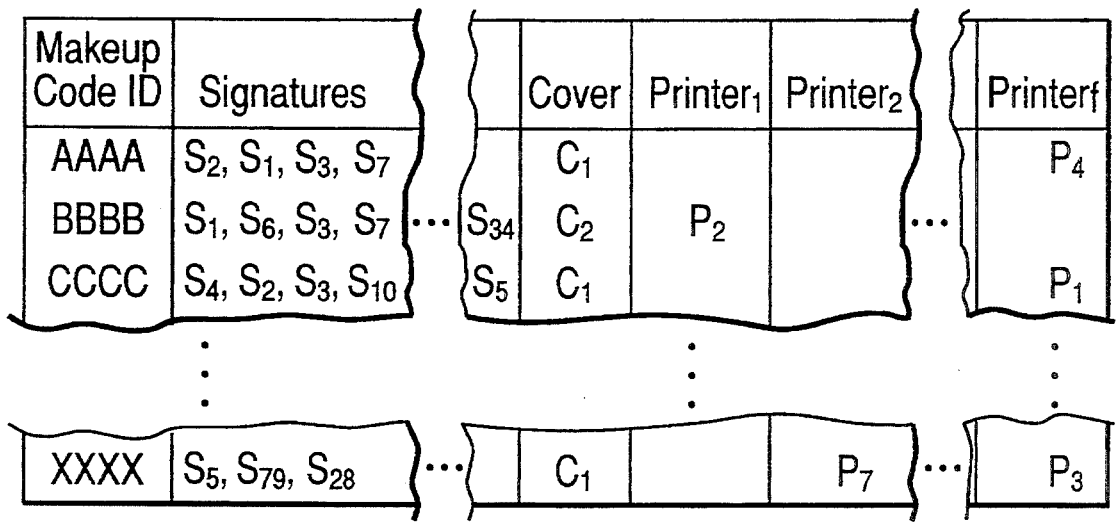

Referring to FIG. 11*b*, control system 20 creates a quality document order (step 462 of FIG. 11*a*) beginning at a decision block 470. An exemplary quality document order is shown in FIG. 12*d* discussed further hereinbelow. At decision block 470, control system 20 determines whether the quality document order is (1) a manual order placed on demand by an operator or (2) a periodic order automatically placed by control system 20. If the quality document order is a periodic order, then at a step 472 control system 20 reads a makeup code table pointer and a dummy identification for the periodic order. If the quality document is a manual order, then at a step 474 control system 20 reads a makeup code table pointer and a dummy identification for the manual order. Makeup codes are discussed further hereinbelow in connection with FIG. 12*a*.

After either of steps 472 and 474, execution continues to a decision block 476 where control system 20 determines whether the operator has specified multiple makeup code definitions through which control system 20 is to cycle. If not, then execution continues to a step 478. Otherwise, if the operator has specified that control system 20 is to cycle through multiple makeup code definitions, then control system increments the makeup code table pointer at a step 480. After step 480, execution continues to step 478.

At step 478, control system 20 reads the makeup code from the makeup code table according to the makeup code table pointer and then writes the makeup code into a quality document order block as discussed further hereinbelow in connection with FIG. 12*d*. At a next step 482, control system 20 writes the dummy identification into the quality document order block. Then, at a step 484, control system 20 establishes a dummy identification for the next quality document.

After establishing a dummy identification for the next quality document, control system 20 determines at a decision block 486 whether any additional quality documents remain to be created in the quality document order. If so, then execution returns to decision block 476. If no more quality documents remain to be created, then execution continues to a step 488 where control system 20 returns the quality document order block.

Referring to FIG. 11*c*, control system 20 formats a quality document order (step 464 of FIG. 11*a*) beginning at a step 490. An exemplary formatted quality document order is shown in FIG. 12*e* discussed further hereinbelow. At step 490, control system 20 determines the print field layout for each printer of document assembly system 10, according to a print group associated with the quality document's makeup code as discussed further hereinbelow in connection with FIG. 12*a*. At a next step 492, on a first line of the quality document's print area, control system 20 fills the first four fields with the quality document's makeup code. Remaining print area is filled with alphanumerics as discussed further herein below in connection with FIG. 13*b*.

Then, at a step 494, control system 20 determines gather pockets for the quality document's makeup code. After determining gather pockets, control system 20 determines cover pocket(s) for the quality document's makeup code at a step 496.

After step 496, control system 20 determines at a decision block 498 whether the quality document order is (1) a manual order placed on demand by an operator or (2) a periodic order automatically placed by control system 20. If the quality document order is a periodic order, then at a step 500 control system 20 sets printer selections according to the definition of the periodically ordered quality document. Then, at a step 502, control system 20 sets divert gate selections according to the definition of the periodically ordered quality document. After step 502, execution continues to a step 504.

If control system 20 determines at decision block 498 that the quality document order is a manual order, then at a step 506 control system 20 sets printer selections according to the definition of the manually ordered quality document. Then, at a step 508, control system 20 sets divert gate selections according to the definition of the manually ordered quality document. After step 508, execution continues to step 504.

At step 504, control system 20 stores the formatted print data, pocket data, and divert gate data for the quality document order as discussed further hereinbelow in connection with FIG. 12e. Then, at a decision block 510, control system 20 determines whether any additional quality documents remain to be formatted in the quality document data block. If additional quality documents remain to be formatted, then execution continues to a step 512 where control system 20 determines the next quality document to process. After step 512, execution returns to step 490. If control system 20 determines at decision block 510 that no additional quality documents remain to be formatted, then execution continues to a step 514 where control system 20 returns the formatted quality document order. 5 FIGS. 12a–e are illustrations of information records processed by control system 20 according to the monitoring technique of FIGS. 11a–c. Together, FIGS. 12a–c illustrate a setup record for a document edition. When control system 20 initiates a quality document order, control system 20 generates simulated tape information for each quality document to be assembled. Such simulated tape information includes the makeup code selected for each quality document. The simulated tape information is distributed in a similar manner as regular tape information. Referring to FIG. 12a, each defined makeup code has an identification (e.g. "AAAA"). Each makeup code defines a cover and a set of signatures for a document. Moreover, each makeup code defines a print group for each printer of document assembly system 10. Table 1 shows exemplary print groups for a particular printer.

TABLE 1

Exemplary Print Groups

| Print Group | Name | Print Information |
|---|---|---|
| P1 | address | 6 lines of address as specified in database |
| P2 | address/renew | 6 lines of address as specified in database and renewal message |
| P3 | null | None |

If a makeup code does not specify a print group for a particular printer, then the printer is not used in assembling documents according to the makeup code.

Referring to FIG. 12b, each of gather pockets D1–Dn is listed as feeding a specified signature (e.g. S4). If "null" is specified for a gather pocket (e.g. D2), then the gather pocket is not used. Similarly, referring to FIG. 12c, each of cover pockets E1–Er is listed as feeding a specified cover (e.g. C2). If "null" is specified for a cover pocket (e.g. Er), then the cover pocket is not used.

FIG. 12d illustrates a document order block as formed at step 478 of FIG. 11b. In the quality document order block, each document has an identification number and a makeup code. The quality document makeup code identification is associated with print content for the quality document.

FIG. 12e illustrates a formatted quality document order. The formatted quality document order merges various information of FIGS. 12a–d. Accordingly, for a document identified in FIG. 12d having a particular makeup code, FIG. 12e lists actual signature pockets used in assembling the document according to FIGS. 12a and 12b. Similarly, FIG. 12e lists actual cover pocket(s) used in assembling the document according to FIGS. 12a and 12c. Further, FIG. 12e lists a respective divert gate and includes formatted print groups for enabled printers.

FIGS. 13a–b are illustrations of an exemplary operation of document assembly system 10 according to the monitoring technique of FIGS. 11a–c. FIG. 13a illustrates assembly by document assembly system 10 of quality documents in response to (1) a manual order of quality documents placed on demand by the operator and (2) a periodic order of quality documents automatically placed by control system 20.

Regular documents are being assembled in slots (K1+12) through (K1+15). After initiating assembly of a specified number (e.g. 1000) of regular documents, control system 20 automatically initiates assembly of a specified number (e.g. 4) of periodic quality ("PQ") documents shown in slots (K1+8) through (K1+11). As shown in FIG. 13a, if the operator specifies periodic initiation of a quality document order, then control system 20 orders assembly of each new quality document according to the operator-selected makeup code following that of the most recently assembled quality document, even where the new quality document and the most recently assembled quality document are assembled at substantially different times in different quality document orders. Also, if the operator specifies periodic initiation, control system 20 returns to the first operator-selected makeup code (e.g. "AAAA") after assembling a quality document with the last operator-selected makeup code (e.g. "ZZZZ").

After initiating assembly of the periodic quality document order, control system 20 initiates assembly of regular documents shown in slots (K+3) through (K1+7). Then, as shown in FIG. 13a, document assembly system 10 assembles demand quality ("DQ") documents in response to a manual order of quality documents placed on demand by the operator. As shown in FIG. 13a, the operator manually ordered two quality documents each of makeup code identification AAAA.

One configurable parameter is whether to print a fact sheet for each assembled quality document. A fact sheet can include information such as (1) the quality document type being assembled, (2) the number of regular documents assembled, (3) the makeup code of the last regular document assembled before the quality document order was started, (4) the makeup code of the quality document, (5) the time and date the quality documents were completed, and (6) the operator who initiated the quality document order. Table 2 shows exemplary fact sheets for quality documents of slots (K1+1), (K1+10) and (K1+11) of FIG. 13a, respectively.

TABLE 2

Exemplary Fact Sheets for Quality Documents

| Fact | Slot | | |
|---|---|---|---|
| | K1 + 1 | K1 + 10 | K1 + 11 |
| Previous Regular Document Makeup Code ID | MMMM | KKKK | KKKK |
| Present Quality Document Makeup Code ID | AAAA | AAAA | ZZZZ |
| Total Number of Regular Documents | 2005 | 2000 | 2000 |
| Time of Assembly | 7.41 | 7.32 | 7.31 |

As shown in FIG. 13b, control system 20 reserves the first four fields on the first lines of print areas 526 and 528 of quality documents 520 (corresponding to the document in slot (K1+10) of FIG. 13a) and 522 (corresponding to the document in slot (K1+11) of FIG. 13a), respectively, to print the quality document's makeup code. Accordingly, quality document 520 is assembled according to makeup code "AAAA", and quality document 522 is assembled according to makeup code "ZZZZ". Remaining print area is filled with alphanumerics.

Document assembly system 10 prints such dummy print information on each quality document, since quality documents are not normally recorded on tape. The makeup code is printed so that the document type is identifiable by visual inspection of the quality document. Dummy print information is generated for the entire length of each print segment to verify alignment of print heads and to show maximum print area configured to be printed. Print area 530 shows normal printing for a regular document 524 (corresponding to the document in slot (K1+12) of FIG. 13a).

Control system 20 monitors quality document assembly throughout document assembly system 10 in the same manner as regular documents, and control system 20 reorders errantly assembled quality documents as discussed further hereinabove in connection with FIGS. 8-10c. Notably, if quality documents are reordered, their contiguousness might be compromised.

Manually ordered quality documents can be initiated before assembly of regular documents begins. Such pre-assembly quality documents are called make-ready documents. Make-ready document orders have the same characteristics as other manually initiated quality document orders. Control system 20 inhibits regular document assembly until the make-ready document order is either completed or stopped by the operator.

Make-ready quality documents are useful for verifying that document assembly system 10 is fully operational and properly configured. Make-ready quality documents are particularly useful for verifying (1) print quality/readability since control system 20 has no means of monitoring print quality, (2) makeup code definitions by cycling through all defined makeup codes to verify signature to pocket mapping and paper in the pocket hoppers, and (3) makeup code print group selections to verify proper selection of the print group for each makeup code and to verify definition of the print group itself.

Although the present invention and its advantages have been described in detail, it should be understood that various changes, substitutions and alterations can be made therein without departing from the spirit and scope of the invention as defined by the appended claims.

What is claimed is:

1. A method of operating a document assembly system, comprising the steps of:
    initiating assembly of a set of documents in a sequence, said documents to be assembled along multiple asynchronously operated sections of a document assembly line of the document assembly system;
    detecting improper assembly of a particular one of said documents at one of said asynchronously operated sections; and
    reinitiating assembly of a replacement for said particular document after each preceding document in said sequence of said set is no longer being assembled, at least one said preceding document being no longer assembled at a different one of said asynchronously operated sections.

2. The method of claim 1 wherein said detecting step comprises the step of detecting improper assembly of a partially assembled one of said documents.

3. The method of claim 1 and further comprising the step of diverting said particular document at an earliest possible divert point along said document assembly line of the document assembly system prior to an end of the document assembly line.

4. The method of claim 1 and further comprising the step of reassigning said replacement to an assigned subset of said set of documents.

5. The method of claim 1 and further comprising the step of disabling initiation of assembly of said documents of said set until assembly of said replacement is initiated.

6. A method of operating a document assembly system, comprising the steps of:
    initiating assembly of a set of documents in a sequence;
    detecting improper assembly of particular ones of said documents;
    storing indications of said particular documents;
    storing said stored indications according to said sequence; and
    reinitiating assembly of replacements for said particular documents according to said sequence in response to said sorted indications.

7. The method of claim 6 wherein said detecting step comprises the step of detecting improper assembly of at least one partially assembled one of said documents.

8. The method of claim 6 and further comprising the step of diverting said particular documents at an earliest possible divert point along a document assembly line of the document assembly system.

9. The method of claim 6 and further comprising the step of reassigning said replacements to respective assigned subsets of said set of documents.

10. The method of claim 6 and further comprising the step of disabling initiation of assembly of said documents of said set until assembly of said replacements is initiated.

11. A system for operating a document assembly system, comprising:
    means for initiating assembly of a set of documents in a sequence, said documents to be assembled along multiple asynchronously operated sections of a document assembly line of the document assembly system;

means for detecting improper assembly of a particular one of said documents at one of said asynchronously operated sections; and means for reinitiating assembly of a replacement for said particular document after each preceding document in said sequence of said set is no longer being assembled, at least one said preceding document being no longer assembled at a different one of said asynchronously operated sections.

12. The system of claim 11 wherein said detecting means is operable to detect improper assembly of a partially assembled one of said documents.

13. The system of claim 11 and further comprising means for diverting said particular document at an earliest possible divert point along said document assembly line of the document assembly system prior to an end of the document assembly line.

14. The system of claim 11 and further comprising means for reassigning said replacement to an assigned subset of said set of documents.

15. The system of claim 11 and further comprising means for disabling initiation of assembly of said documents of said set until assembly of said replacement is initiated.

16. A system for operating a document assembly system, comprising:

means for initiating assembly of a set of documents in a sequence;

means for detecting improper assembly of particular ones of said documents;

storing indications of said particular documents;

sorting said stored indications according to said sequence; and means for reinitiating assembly of replacements for said particular documents according to said sequence in response to said sorted indications.

17. The system of claim 16 wherein said detecting means is operable to detect improper assembly of at least one partially assembled one of said documents.

18. The system of claim 16 and further comprising means for diverting said particular documents at an earliest possible divert point along a document assembly line of the document assembly system.

19. The system of claim 16 and further comprising means for reassigning said replacements to respective assigned subsets of said set of documents.

20. The system of claim 16 and further comprising means for disabling initiation of assembly of said documents of said set until assembly of said replacements is initiated.

21. A computer program for operating a document assembly system, comprising:

means for initiating assembly of a set of documents in a sequence, said documents to be assembled along multiple asynchronously operated sections of a document assembly line of the document assembly system;

means for detecting improper assembly of a particular one of said documents at one of said asynchronously operated sections; and means for reinitiating assembly a replacement for said particular document after each preceding document in said sequence of said set is no longer being assembled, at least one said preceding document being no longer assembled at a different one of said asynchronously operated sections.

22. The computer program of claim 21 wherein said detecting means is operable to detect improper assembly of a partially assembled one of said documents.

23. The computer program of claim 21 and further comprising means for diverting said particular document at an earliest possible divert point along said document assembly line of the document assembly system prior to an end of the document assembly line.

24. The computer program of claim 21 and further comprising means for reassigning said replacement to an assigned subset of said set of documents.

25. The computer program of claim 21 and further comprising means for disabling initiation of assembly of said documents of said set until assembly of said replacement is initiated.

26. A computer program for operating a document assembly system, comprising:

means for initiating assembly of a set of documents in a sequence;

means for detecting improper assembly of particular ones of said documents;

storing indications of said particular documents;

sorting said stored indications according to said sequence; and means for reinitiating assembly of replacements for said particular documents according to said sequence in response to said sorted indications.

27. The computer program of claim 26 wherein said detecting means is operable to detect improper assembly of at least one partially assembled one of said documents.

28. The computer program of claim 26 and further comprising means for diverting said particular documents at an earliest possible divert point along a document assembly line of the document assembly system.

29. The computer program of claim 26 and further comprising means for reassigning said replacements to respective assigned subsets of said set of documents.

30. The computer program of claim 26 and further comprising means for disabling initiation of assembly of said documents of said set until assembly of said replacements is initiated.

* * * * *